US012800697B2

(12) United States Patent
Fischer et al.

(10) Patent No.: US 12,800,697 B2
(45) Date of Patent: Nov. 17, 2026

(54) CONTROLLING REPEATED REQUESTS FROM A USER EQUIPMENT (UE) FOR POSITIONING ASSISTANCE IN A WIRELESS NETWORK

(71) Applicant: QUALCOMM Incorporated, San Diego, CA (US)

(72) Inventors: Sven Fischer, Nuremberg (DE); Stephen William Edge, Escondido, CA (US); Sony Akkarakaran, Poway, CA (US); Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/573,898

(22) PCT Filed: Jul. 13, 2022

(86) PCT No.: PCT/US2022/073695
§ 371 (c)(1),
(2) Date: Dec. 22, 2023

(87) PCT Pub. No.: WO2023/009938
PCT Pub. Date: Feb. 2, 2023

(65) Prior Publication Data

US 2024/0361421 A1 Oct. 31, 2024

(30) Foreign Application Priority Data

Jul. 30, 2021 (IN) ............................ 202121034431
Aug. 6, 2021 (IN) ............................ 202121035689

(51) Int. Cl.
*G01S 5/02* (2010.01)
*H04W 64/00* (2009.01)

(52) U.S. Cl.
CPC ......... *G01S 5/0236* (2013.01); *H04W 64/003* (2013.01)

(58) Field of Classification Search
CPC ... H04W 64/00; H04W 64/003; H04W 24/08; H04W 48/10; G01S 19/43; G01S 5/0205; G01S 5/0236; G01S 5/0252; H04L 5/0048
See application file for complete search history.

(56) References Cited

U.S. PATENT DOCUMENTS 12,557,124 B2 * 2/2026 Kim ...................... H04W 72/40
2020/0280951 A1 * 9/2020 Tsuda ...................... G01S 19/47
(Continued)

FOREIGN PATENT DOCUMENTS

EP 4376508 A1 * 5/2024 ............ H04W 24/10
WO WO-2022139092 A1 * 6/2022 ........... H04L 5/0048
WO WO-2023000227 A1 * 1/2023 ............ H04W 24/10

OTHER PUBLICATIONS

3GPP TS 38.305: "3rd Generation Partnership Project, Technical Specification Group Radio Access Network, NG Radio Access Network (NG-RAN), Stage 2 Functional Specification of User Equipment (UE) Positioning in NG-RAN (Release 16)", 3GPP Standard, Technical Specification, 3rd Generation Partnership Project (3GPP), Mobile Competence Centre, 650, Route Des Lucioles, F-06921, Sophia-Antipolis Cedex, France, vol. RAN WG2, No. V16.5.0, Jul. 6, 2021, XP052030214, pp. 1-20, paragraph [8.1.3.2.2a].

(Continued)

*Primary Examiner* — Siu M Lee
(74) *Attorney, Agent, or Firm* — Muncy, Geissler, Olds & Lowe, P.C.

(57) ABSTRACT

Disclosed are techniques for wireless positioning. In an aspect, a user equipment (UE) transmits a first request
(Continued)

assistance data message to a location server, the first request assistance data message comprising a request for first positioning assistance, receives a provide assistance data message from the location server, the provide assistance data message indicating that the location server is not currently able to provide the first positioning assistance, and transmits a second request assistance data message to the location server after expiration of a reattempt time from reception of the provide assistance data message, the second request assistance data message indicating a request for second positioning assistance, wherein the first positioning assistance is not received by the UE prior to the reattempt time.

19 Claims, 18 Drawing Sheets

(56) References Cited

U.S. PATENT DOCUMENTS

| | | | | |
|---|---|---|---|---|
| 2024/0179583 | A1* | 5/2024 | Rao | G01S 5/0036 |
| 2024/0187903 | A1* | 6/2024 | Hasegawa | H04B 17/328 |

OTHER PUBLICATIONS

Ericsson: "Report on Procedures and Signalling for On-Demand PRS", 3GPP TSG-RAN WG2 #116-bis, R2-2200047, 3rd Generation Partnership Project (3GPP), Mobile Competence Centre, 650, Route Des Lucioles, F-06921, Sophia-Antipolis Cedex, France, vol. RAN WG2, No. Electronic meeting, Jan. 17, 2022-Jan. 25, 2022, Jan. 5, 2022 (Jan. 5, 2022), XP052089823, pp. 1-19, paragraph [03.4].

International Search Report and Written Opinion—PCT/US2022/073695—ISA/EPO—Oct. 31, 2022.

Lenovo., et al., "Report of [Pre117-e][608][POS] Open Issues on On-Demand PRS", 3GPP TSG RAN WG2 Meeting#117-e, R2-2202236, 3rd Generation Partnership Project (3GPP), Mobile Competence Centre, 650, Route Des Lucioles, F-06921, Sophia-Antipolis Cedex, France, vol. RAN WG2, No. Electronic Meeting, Feb. 21, 2022-Mar. 3, 2022, Feb. 17, 2022, XP052122664, pp. 1-34, paragraph [03.5].

Qualcomm Incorporated: "On-Demand DL-PRS", 3GPP TSG-RAN WG2 Meeting #114-e, R2-2106084, 3rd Generation Partnership Project, Mobile Competence Centre, 650, Route Des Lucioles, F-06921, Sophia-Antipolis Cedex, France, vol. RAN WG2. No. Electronic, May 19, 2021-May 27, 2021, May 11, 2021, XP052007454, pp. 1-10, section 7.x.2, pp. 3-5.

Qualcomm Incorporated: "Remaining Issues for On-Demand DL-PRS", 3GPP TSG-RAN WG2 Meeting #116-e, R2-2110825, 3rd Generation Partnership Project (3GPP), Mobile Competence Centre, 650, Route Des Lucioles, F-06921, Sophia-Antipolis Cedex, France, vol. RAN WG2, No. Electronic, Nov. 1, 2021-Nov. 12, 2021, Oct. 22, 2021, XP052067265, pp. 1-16, Proposal 6.

* cited by examiner

CONTROLLING REPEATED REQUESTS FROM A USER EQUIPMENT (UE) FOR POSITIONING ASSISTANCE IN A WIRELESS NETWORK

CROSS-REFERENCE TO RELATED APPLICATIONS

The present Application for Patent claims the benefit of IN Application No. 202121034431, entitled "CONTROLLING REPEATED REQUESTS FROM A USER EQUIPMENT (UE) FOR POSITIONING ASSISTANCE IN A WIRELESS NETWORK", filed Jul. 30, 2021, and IN Application No. 202121035689, entitled CONTROLLING REPEATED REQUESTS FROM A USER EQUIPMENT (UE) FOR POSITIONING ASSISTANCE IN A WIRELESS NETWORK, filed Aug. 6, 2021, and is a national stage application, filed under 35 U.S.C. § 371, of International Patent Application. No. PCT/US2022/073695, entitled, "CONTROLLING REPEATED REQUESTS FROM A USER EQUIPMENT (UE) FOR POSITIONING ASSISTANCE IN A WIRELESS NETWORK", filed Jul. 13, 2022, all of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a user equipment (UE) includes transmitting a first request assistance data message to a location server, the first request assistance data message comprising a request for first positioning assistance; receiving a provide assistance data message from the location server, the provide assistance data message indicating that the location server is not currently able to provide the first positioning assistance; and transmitting a second request assistance data message to the location server after expiration of a reattempt time from reception of the provide assistance data message, the second request assistance data message indicating a request for second positioning assistance, wherein the first positioning assistance is not received by the UE prior to the reattempt time.

In an aspect, a method of positioning performed by a location server includes receiving a first request assistance data message from a user equipment (UE), the first request assistance data message comprising a request for first positioning assistance; transmitting a provide assistance data message to the UE, the provide assistance data message indicating that the location server is not currently able to provide the first positioning assistance; and receiving a second request assistance data message from the UE after expiration of a reattempt time from reception of the provide assistance data message, the second request assistance data message indicating a request for second positioning assistance, wherein the first positioning assistance is not transmitted to the UE prior to the reattempt time.

In an aspect, a user equipment (UE) includes a memory; at least one transceiver; and at least one processor communicatively coupled to the memory and the at least one transceiver, the at least one processor configured to: transmit, via the at least one transceiver, a first request assistance data message to a location server, the first request assistance data message comprising a request for first positioning assistance; receive, via the at least one transceiver, a provide assistance data message from the location server, the provide assistance data message indicating that the location server is not currently able to provide the first positioning assistance; and transmit, via the at least one transceiver, a second request assistance data message to the location server after expiration of a reattempt time from reception of the provide assistance data message, the second request assistance data message indicating a request for second positioning assistance, wherein the first positioning assistance is not received by the UE prior to the reattempt time.

In an aspect, a location server includes a memory; at least one transceiver; and at least one processor communicatively coupled to the memory and the at least one transceiver, the at least one processor configured to: receive, via the at least one transceiver, a first request assistance data message from a user equipment (UE), the first request assistance data message comprising a request for first positioning assistance; transmit, via the at least one transceiver, a provide assistance data message to the UE, the provide assistance data message indicating that the location server is not currently able to provide the first positioning assistance; and receive, via the at least one transceiver, a second request assistance data message from the UE after expiration of a reattempt time from reception of the provide assistance data message, the second request assistance data message indicating a request for second positioning assistance, wherein the first positioning assistance is not transmitted to the UE prior to the reattempt time.

In an aspect, a user equipment (UE) includes means for transmitting a first request assistance data message to a location server, the first request assistance data message comprising a request for first positioning assistance; means for receiving a provide assistance data message from the location server, the provide assistance data message indicating that the location server is not currently able to provide the first positioning assistance; and means for transmitting a second request assistance data message to the location server after expiration of a reattempt time from reception of the provide assistance data message, the second request assistance data message indicating a request for second positioning assistance, wherein the first positioning assistance is not received by the UE prior to the reattempt time.

In an aspect, a location server includes means for receiving a first request assistance data message from a user equipment (UE), the first request assistance data message comprising a request for first positioning assistance; means for transmitting a provide assistance data message to the UE, the provide assistance data message indicating that the location server is not currently able to provide the first positioning assistance; and means for receiving a second request assistance data message from the UE after expiration of a reattempt time from reception of the provide assistance data message, the second request assistance data message indicating a request for second positioning assistance, wherein the first positioning assistance is not transmitted to the UE prior to the reattempt time.

In an aspect, a non-transitory computer-readable medium storing computer-executable instructions that, when executed by a user equipment (UE), cause the UE to: transmit a first request assistance data message to a location server, the first request assistance data message comprising a request for first positioning assistance; receive a provide assistance data message from the location server, the provide assistance data message indicating that the location server is not currently able to provide the first positioning assistance; and transmit a second request assistance data message to the location server after expiration of a reattempt time from reception of the provide assistance data message, the second request assistance data message indicating a request for second positioning assistance, wherein the first positioning assistance is not received by the UE prior to the reattempt time.

In an aspect, a non-transitory computer-readable medium storing computer-executable instructions that, when executed by a location server, cause the location server to: receive a first request assistance data message from a user equipment (UE), the first request assistance data message comprising a request for first positioning assistance; transmit a provide assistance data message to the UE, the provide assistance data message indicating that the location server is not currently able to provide the first positioning assistance; and receive a second request assistance data message from the UE after expiration of a reattempt time from reception of the provide assistance data message, the second request assistance data message indicating a request for second positioning assistance, wherein the first positioning assistance is not transmitted to the UE prior to the reattempt time.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
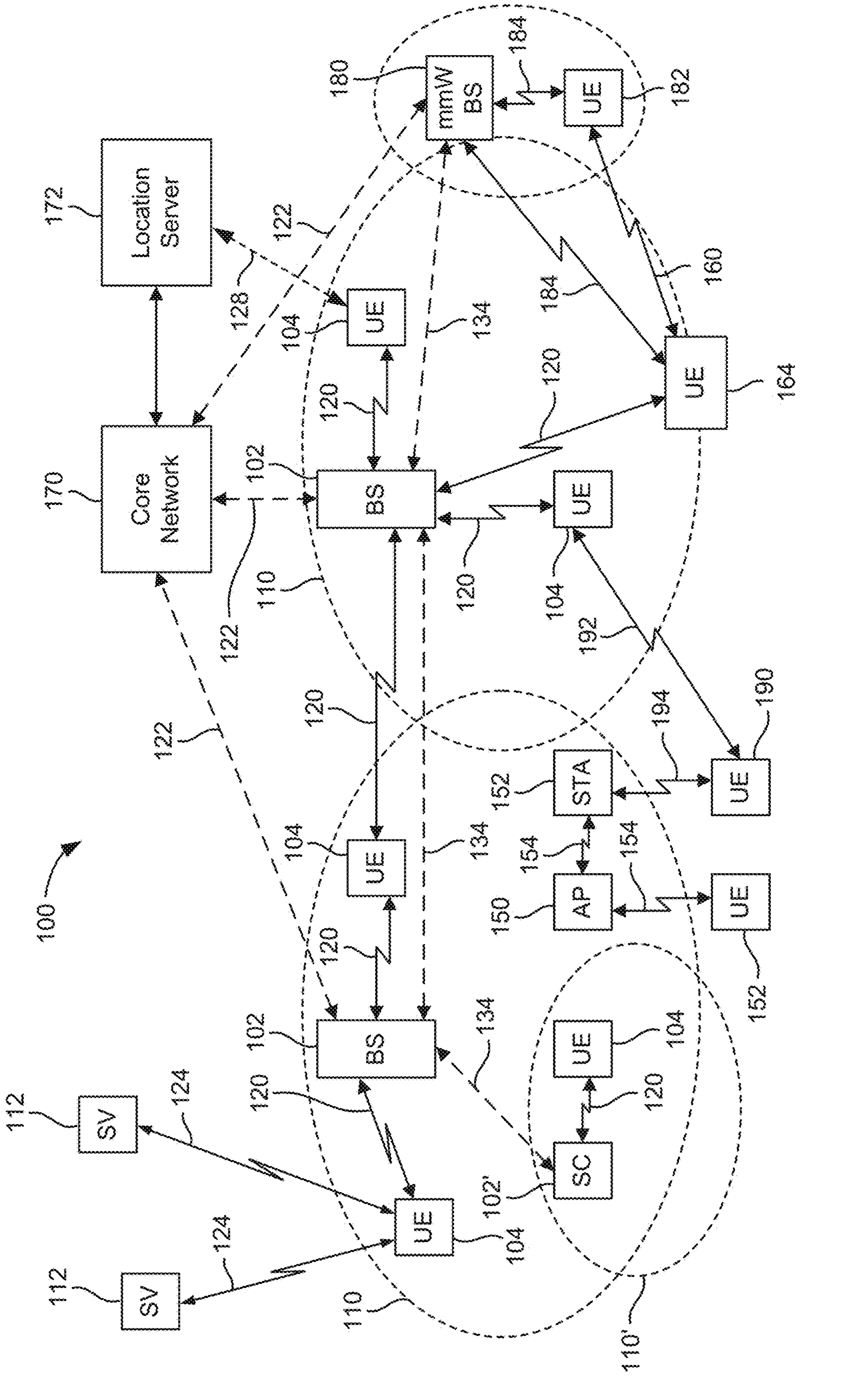
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with abase station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range.

Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RE signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g. FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 1.04 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
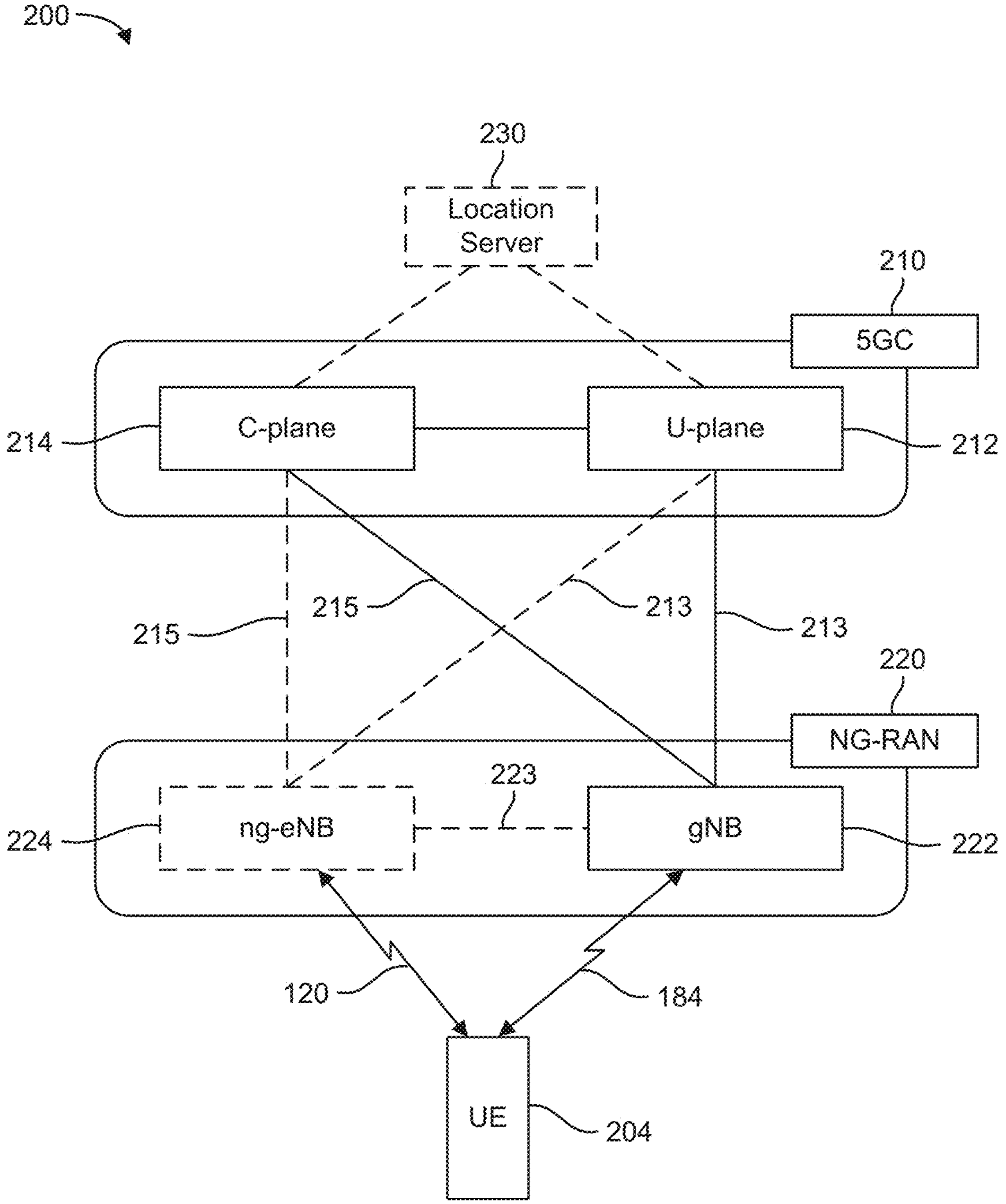
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
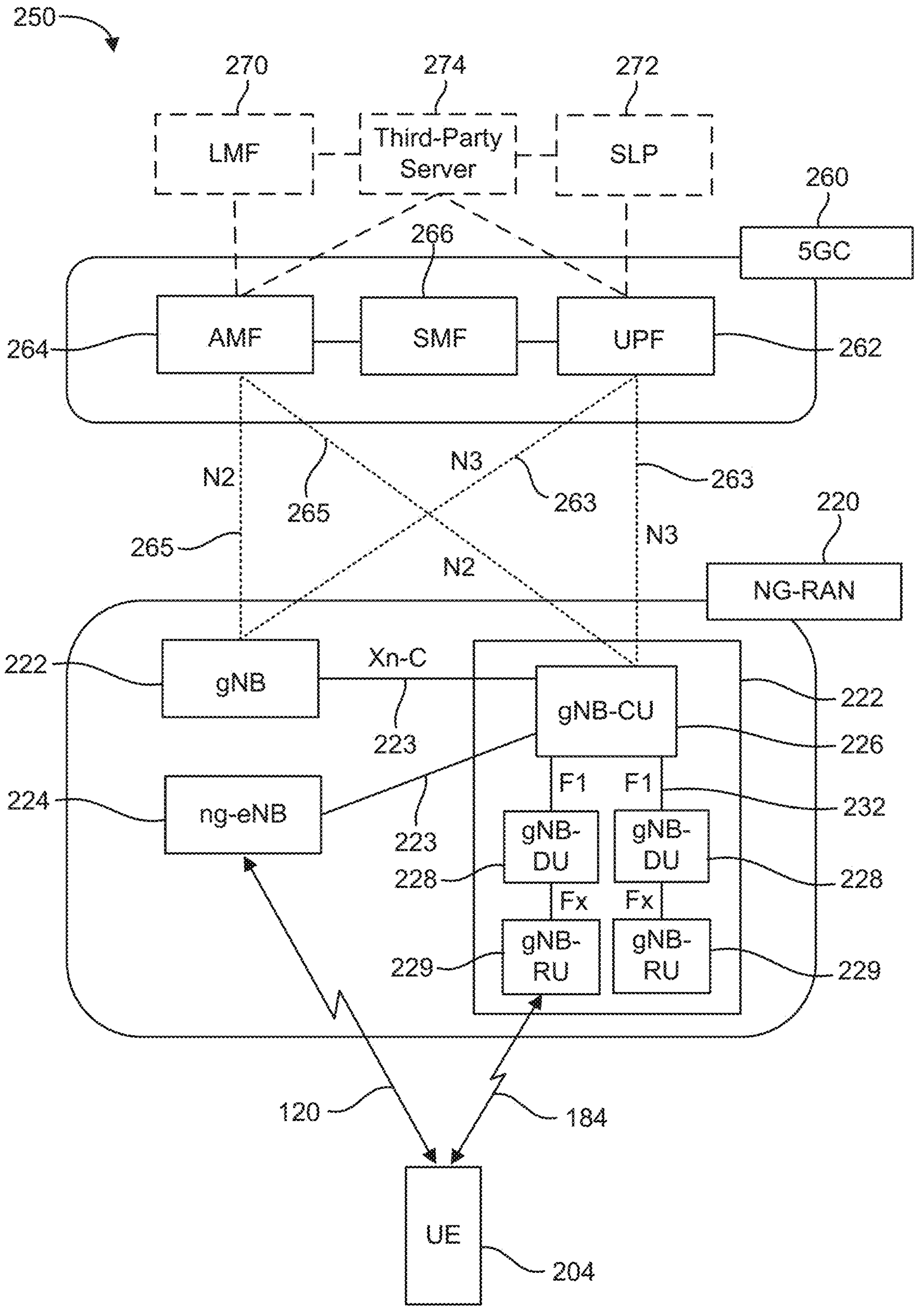

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AIF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for LEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally hosts the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-Dus 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
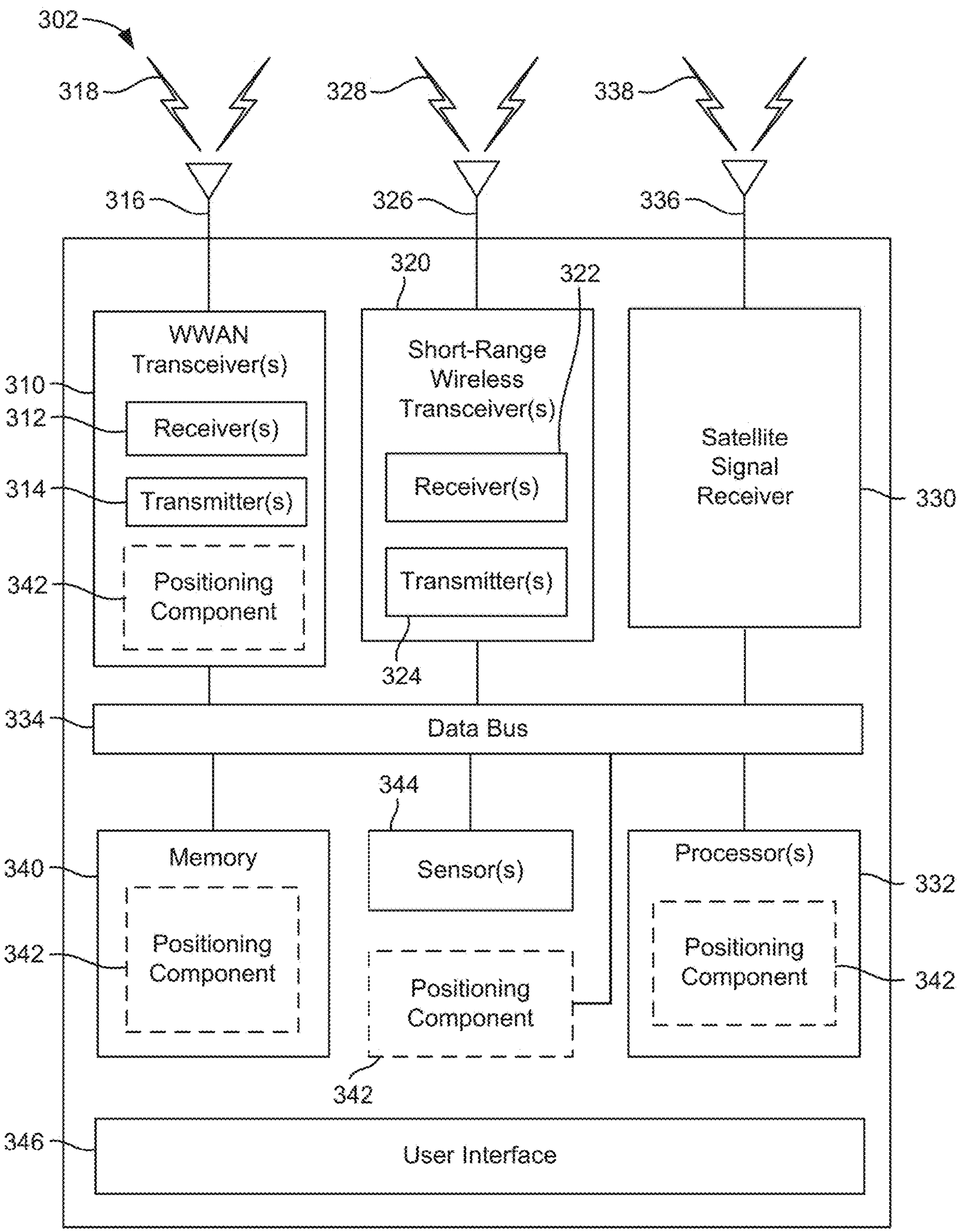
FIGS. 3A, 3B, and 3C are simplified block diagrams of several sample aspects of components that may be employed in a user equipment (UE), a base station, and a network entity, respectively, and configured to support communications as taught herein.
Figure 3B:
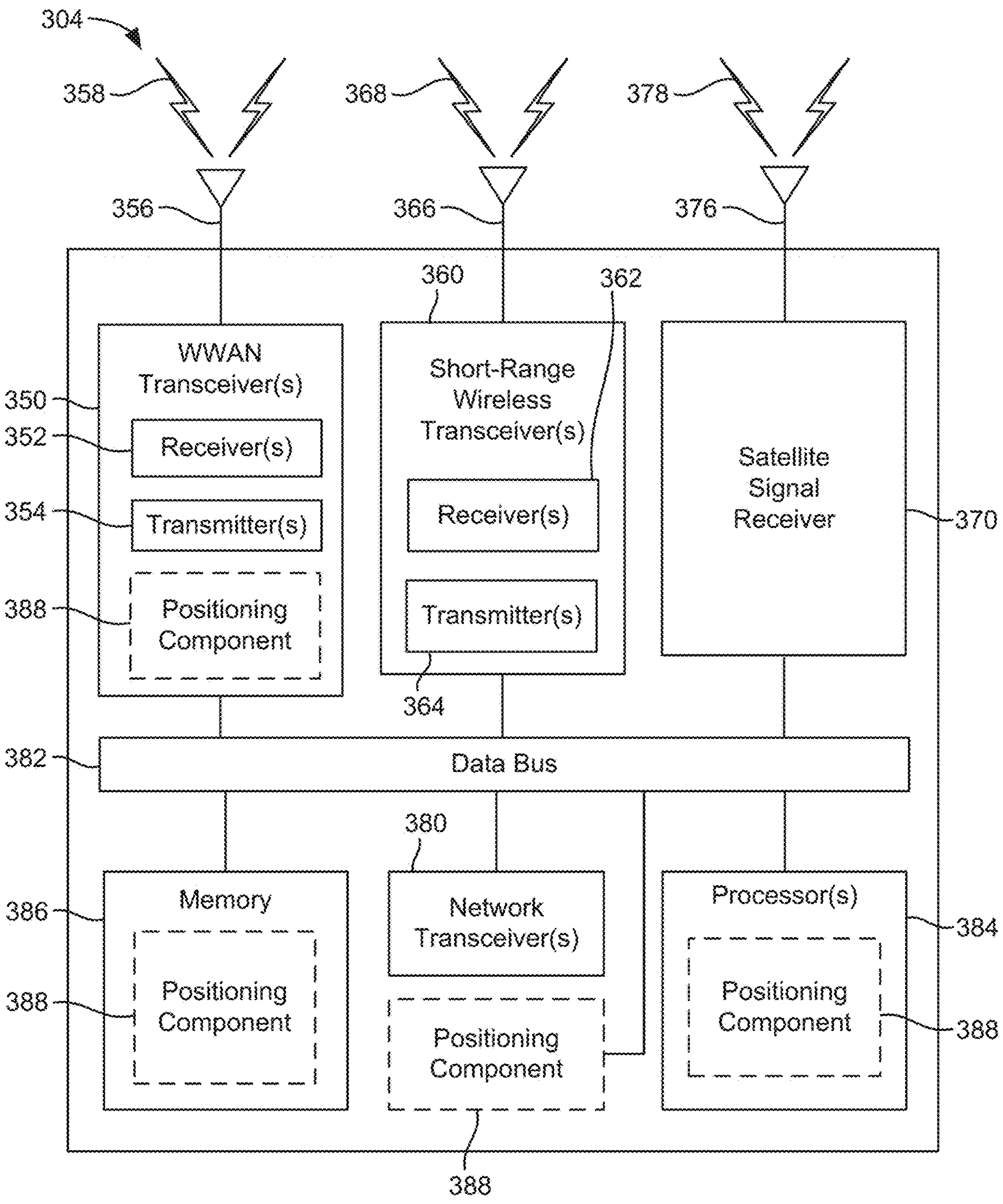
Figure 3C:
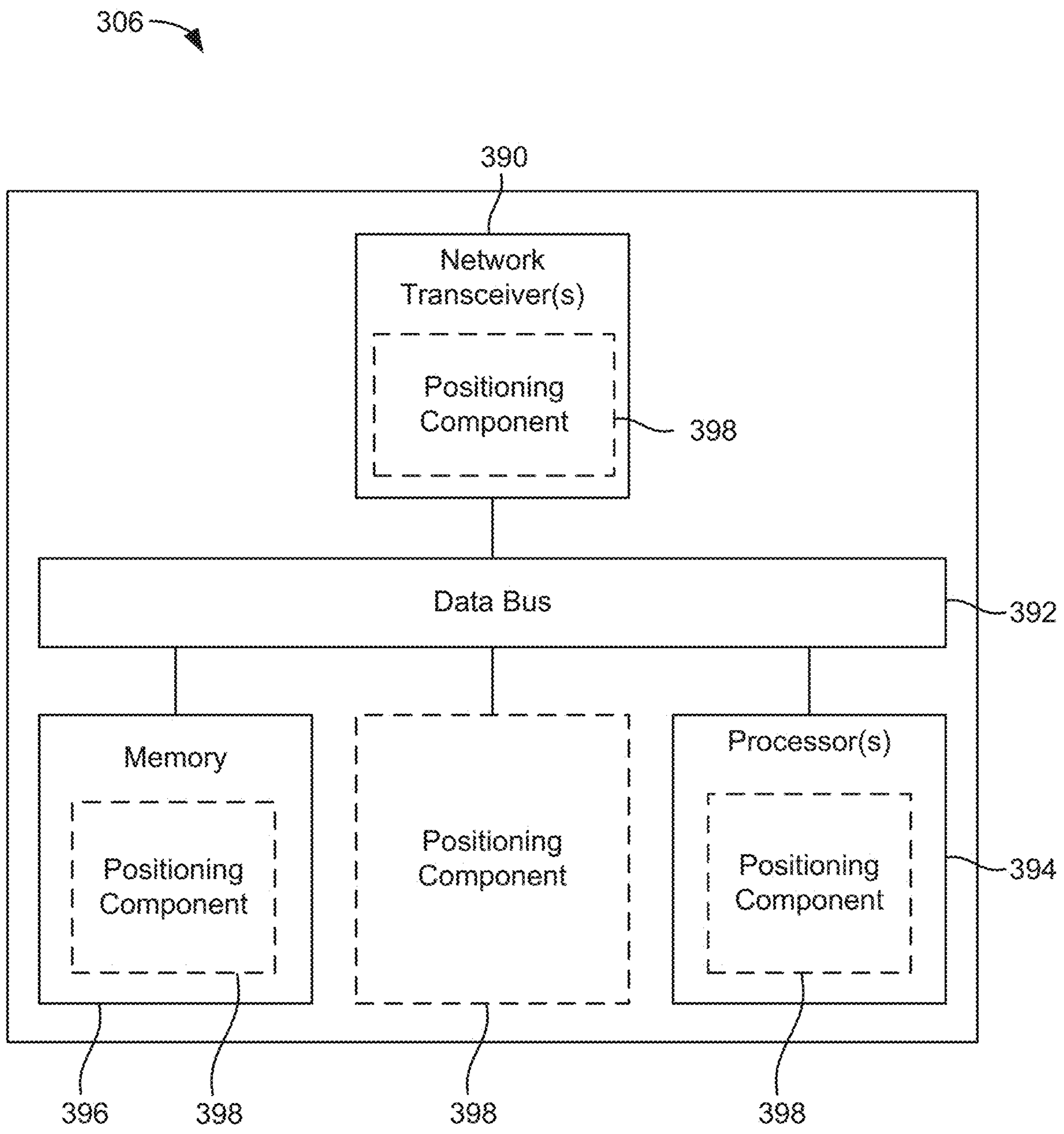

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provide demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provide demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
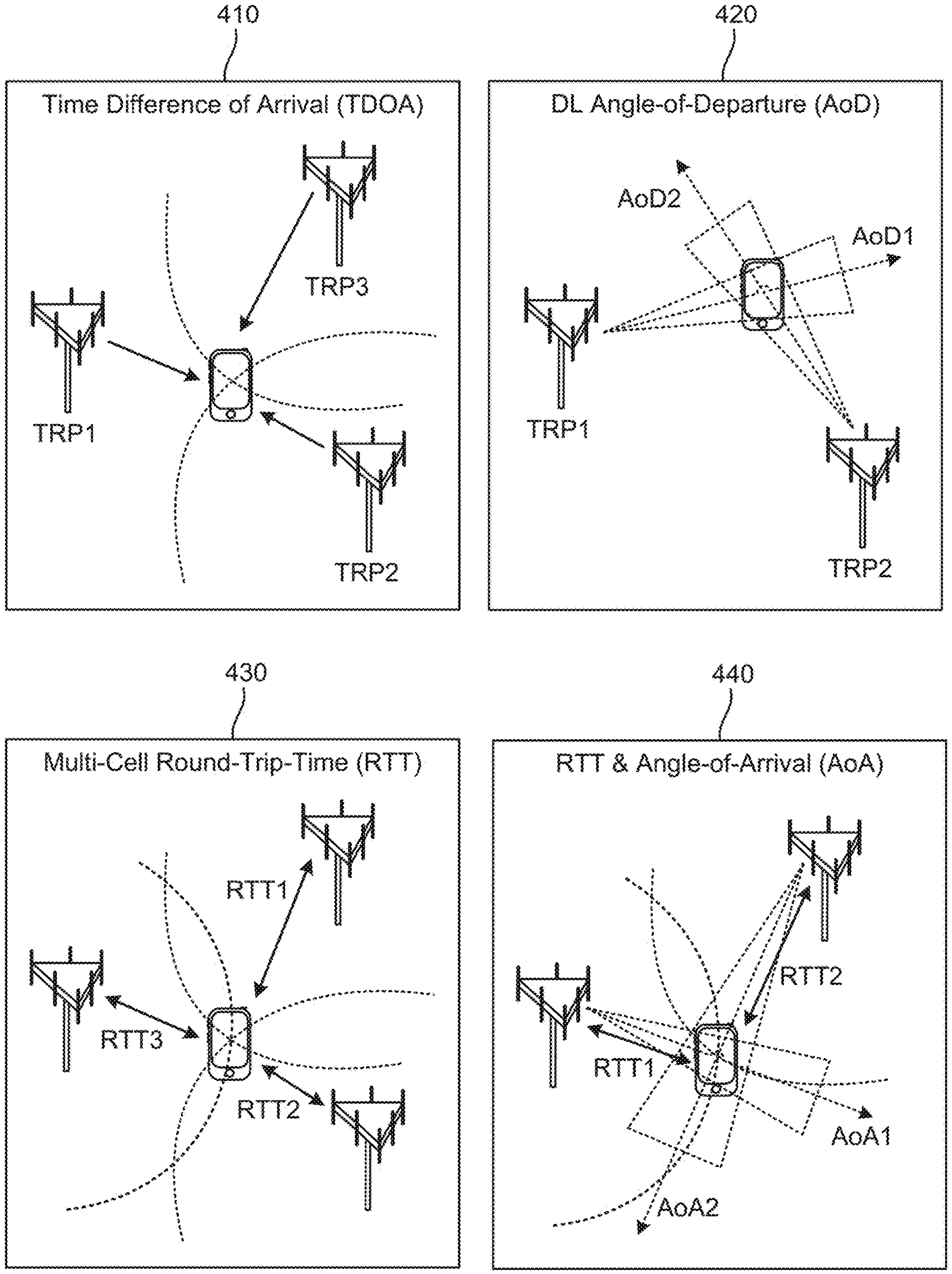
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a. UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 420, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RIT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RIT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, illustrated by scenario 440, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

NR also supports a number of non-cellular positioning technologies, sometimes referred to as "RAT-independent" positioning, including network-assisted GNSS methods, WLAN positioning, Bluetooth positioning, terrestrial beacon system (TBS) positioning, such as Metropolitan Beacon Systems (MBS), sensor based methods, such as barometric pressure sensor, motion sensor, or Inertial Measurement Units (IMUs).

Network-assisted GNSS methods make use of UEs that are equipped with radio receivers capable of receiving GNSS signals. The WLAN positioning method makes use of the WLAN measurements (e.g., AP identifiers and other measurements) and databases to determine the location of the UE. The Bluetooth positioning method makes use of Bluetooth measurements (e.g., beacon identifiers and other measurements) to determine the location of the UE. A TBS consists of a network of ground-based transmitters broadcasting signals only for positioning purposes. The sensor method makes use of different sensors, such as barometric pressure sensors, accelerometers, gyros, magnetometers, etc. to obtain location information of the UE.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 Vs.

In the case of a network-assisted GNSS positioning procedure, the assistance data may include data assisting the measurement, such as reference time, visible satellite list, satellite signal Doppler, code phase, Doppler and code phase search windows; data providing means for position calculation, such as reference time, reference position, satellite ephemeris, clock corrections, code and carrier phase measurements from a GNSS reference receiver or network of receivers; data increasing the position accuracy, such as satellite code biases, satellite orbit corrections, satellite clock corrections, atmospheric models, Real Time Kinematic (RTK) or Precise Point Positioning (PPP) assistance data in observation space representation (OSR) or state space representation (SSR).

In the case of a WLAN positioning procedure, the assistance data may include a list of WLAN APs together with AP identifiers and possible AP location. In the case of a Bluetooth positioning procedure, the assistance data may include a list of Bluetooth beacons together with identifiers and possible beacon locations. In the case of a TBS positioning procedure, the assistance data may include a list of terrestrial beacons together with beacon locations. In the case of a sensor positioning procedure, the assistance data may include reference atmospheric pressure information.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
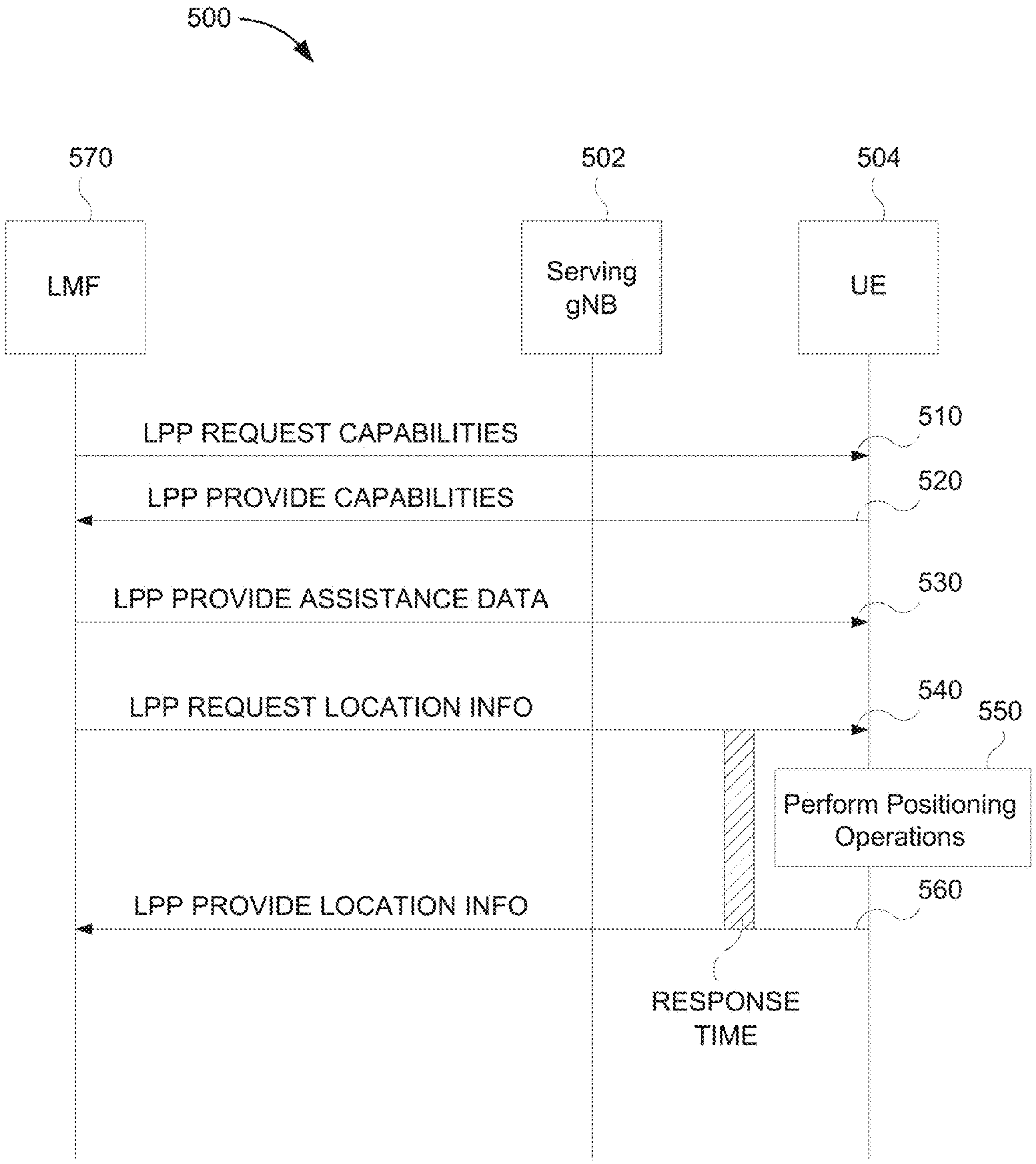
FIG. 5 illustrates an example Long-Term Evolution (LTE) positioning protocol (LPP) call flow between a UE and a location server for performing positioning operations.

FIG. 5 illustrates an example Long-Term Evolution (LTE) positioning protocol (LPP) procedure 500 between a UE 504 and a location server (illustrated as a location management function (LMF) 570) for performing positioning operations. As illustrated in FIG. 5, positioning of the UE 504 is supported via an exchange of LPP messages between the UE 504 and the LMF 570. The LPP messages may be exchanged between UE 504 and the LMF 570 via the UE's 504 serving base station (illustrated as a serving gNB 502) and a core network (not shown). The LPP procedure 500 may be used to position the UE 504 in order to support various location-related services, such as navigation for UE 504 (or for the user of UE 504), or for routing, or for provision of an accurate location to a public safety answering point (PSAP) in association with an emergency call from UE 504 to a PSAP, or for some other reason. The LPP procedure 500 may also be referred to as a positioning session, and there may be multiple positioning sessions for different types of positioning methods (e.g., downlink time difference of arrival (DL-TDOA), round-trip-time (RTT), enhanced cell identity (E-CID), etc.).

Initially, the UE 504 may receive a request for its positioning capabilities from the LMF 570 at stage 510 (e.g., an LPP Request Capabilities message). At stage 520, the UE 504 provides its positioning capabilities to the LMF 570 relative to the LPP protocol by sending an LPP Provide Capabilities message to LMF 570 indicating the position methods and features of these position methods that are supported by the UE 504 using LPP. The capabilities indicated in the LPP Provide Capabilities message may, in some aspects, indicate the type of positioning the UE 504 supports (e.g., DL-TDOA, RTT, E-CID, etc.) and may indicate the capabilities of the UE 504 to support those types of positioning.

Upon reception of the LPP Provide Capabilities message, at stage 520, the LMF 570 determines to use a particular type of positioning method (e.g., DL-TDOA, RTT, E-CID, etc.) based on the indicated type(s) of positioning the UE 504 supports and determines a set of one or more transmission-reception points (TRPs) from which the UE 504 is to measure downlink positioning reference signals or towards which the UE 504 is to transmit uplink positioning reference signals. At stage 530, the LMF 570 sends an LPP Provide Assistance Data message to the UE 504 identifying the set of TRPs.

In some implementations, the LPP Provide Assistance Data message at stage 530 may be sent by the LMF 570 to the UE 504 in response to an LPP Request Assistance Data message sent by the UE 504 to the LMF 570 (not shown in FIG. 5). An LPP Request Assistance Data message may include an identifier of the UE's 504 serving TRP and a request for the positioning reference signal (PRS) configuration of neighboring TRPs.

At stage 540, the LMF 570 sends a request for location information to the UE 504. The request may be an LPP Request Location Information message. This message usually includes information elements defining the location information type, desired accuracy of the location estimate, and response time (i.e., desired latency). Note that a low latency requirement allows for a longer response time while a high latency requirement requires a shorter response time. However, a long response time is referred to as high latency and a short response time is referred to as low latency.

Note that in some implementations, the LPP Provide Assistance Data message sent at stage 530 may be sent after the LPP Request Location Information message at 540 if, for example, the UE 504 sends a request for assistance data to LMF 570 (e.g., in an LPP Request Assistance Data message, not shown in FIG. 5) after receiving the request for location information at stage 540.

At stage 550, the UE 504 utilizes the assistance information received at stage 530 and any additional data (e.g., a desired location accuracy or a maximum response time) received at stage 540 to perform positioning operations (e.g., measurements of DL-PRS, transmission of UL-PRS, etc.) for the selected positioning method.

At stage 560, the UE 504 may send an LPP Provide Location Information message to the LMF 570 conveying the results of any measurements that were obtained at stage 550 (e.g., time of arrival (ToA), reference signal time difference (RSTD), reception-to-transmission (Rx-Tx), etc.) and before or when any maximum response time has expired (e.g., a maximum response time provided by the LMF 570 at stage 540). The LPP Provide Location Information message at stage 560 may also include the time (or times) at which the positioning measurements were obtained and the identity of the TRP(s) from which the positioning measurements were obtained. Note that the time between the request for location information at 540 and the response at 560 is the "response time" and indicates the latency of the positioning session.

The LMF 570 computes an estimated location of the UE 504 using the appropriate positioning techniques (e.g., DL-TDOA, RTT, E-CID, etc.) based, at least in part, on measurements received in the LPP Provide Location Information message at stage 560.

Figure 6:
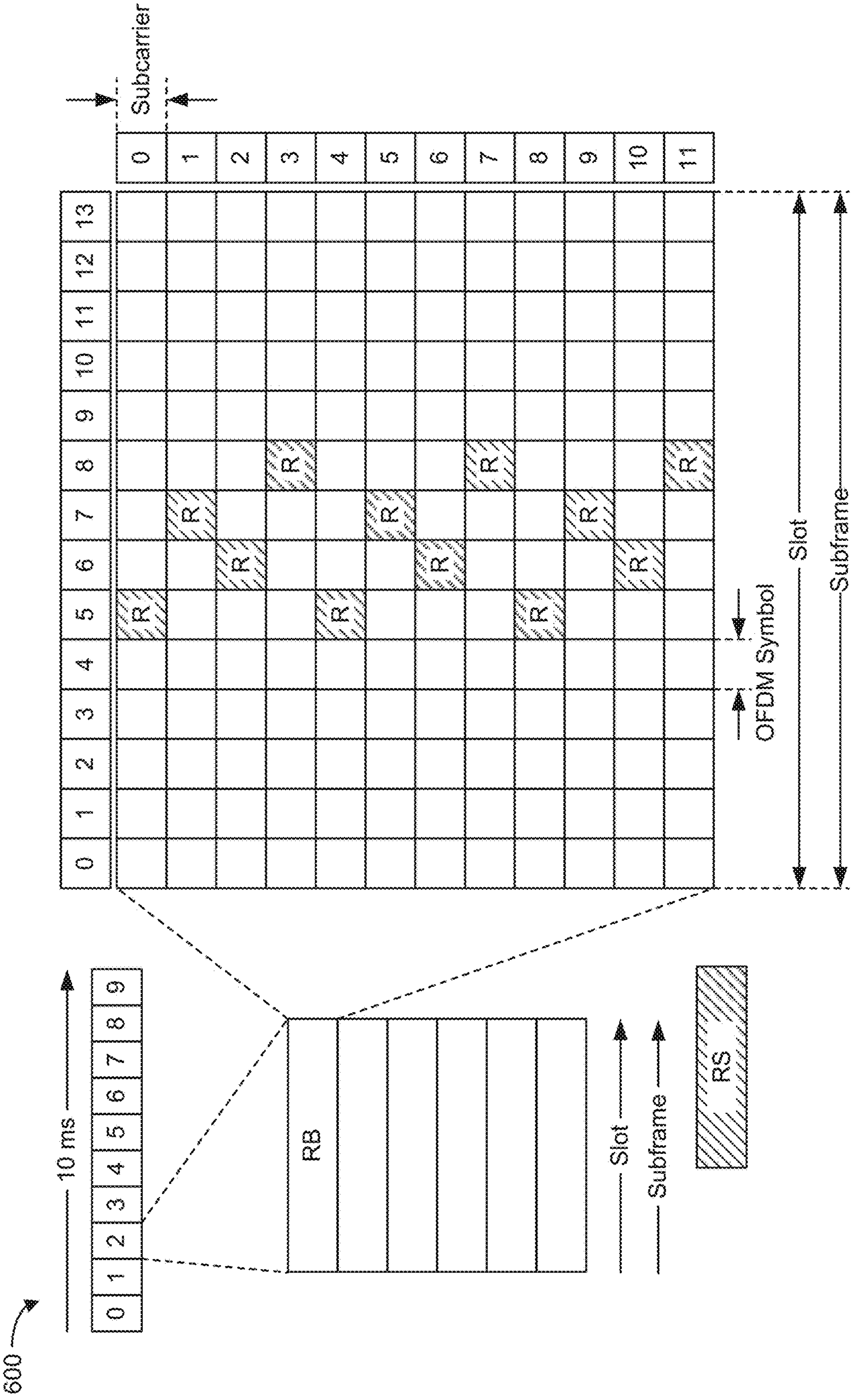
FIG. 6 is a diagram illustrating an example frame structure, according to aspects of the disclosure.

Various frame structures may be used to support downlink and uplink transmissions between network nodes (e.g., base stations and UEs). FIG. 6 is a diagram 600 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 6, a numerology of 15 kHz is used. Thus, in the time domain, a 10 ms frame is divided into 10 equally sized subframes of 1 ms each, and each subframe includes one time slot. In FIG. 6, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 6, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 6 illustrates example locations of REs carrying a reference signal (labeled "R").

PRS have been defined for NR positioning to enable UEs to detect and measure more neighboring TRPs. Several configurations are supported to enable a variety of deployments (e.g., indoor, outdoor, sub-6 GHz, mmW). In addition, PRS may be configured for both UE-based and UE-assisted positioning procedures. The following table illustrates various types of reference signals that can be used for various positioning methods supported in NR.

TABLE 1

| DL/UL Reference Signals | UE Measurements | To support the following positioning techniques |
|---|---|---|
| DL-PRS | DL-RSTD | DL-TDOA |
| DL-PRS | DL-PRS RSRP | DL-TDOA, DL-AoD, Multi-RTT |
| DL-PRS/SRS-for-positioning | UE Rx-Tx | Multi-RTT |
| SSB/CSI-RS for RRM | Synchronization Signal (SS)-RSRP (RSRP for RRM), SS-RSRQ (for RRM), CSI-RSRP (for RRM), CSI-RSRQ (for RRM) | E-CID |

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 6 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}(as in the example of FIG. 6); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu\{4, 5, 8, 10, 16, 20, 32, 40, 64, 80, 160, 320, 640, 1280, 2560, 5120, 10240\}$slots, with $\mu=0, 1, 2, 3$. The repetition factor may have a length selected from {1, 2, 4, 6, 8, 16, 32}slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

On-demand PRS refers to the capability to allow a UE or LMF to request DL-PRS for positioning measurements or a change in available DL-PRS such as a change in resources assigned for DL-PRS transmission (e.g., changed bandwidth, changed duration of positioning occasions and/or changed frequency of positioning occasions, etc.) and possibly to indicate when (changed) DL-PRS transmission is no longer needed.

For example, the signalling could allow an increase in resources assigned for DL-PRS transmission (e.g., increased bandwidth, specific TRPs, or beam directions) and possibly to indicate when DL-PRS transmission is no longer needed. Increased DL-PRS transmission could be simplified by being restricted to only certain DL-PRS configurations that might be configured in gNBs and/or an LMF. For example, there might be one set of DL-PRS configuration parameters corresponding to "normal" DL-PRS transmission in the absence of any request for increased DL-PRS transmission. In some networks, the "normal" DL-PRS transmission might equate to no DL-PRS transmission at all (to minimize resource usage). There could then be one or more levels of increased DL-PRS transmission, each associated with a different set of DL-PRS configuration parameters. In the simplest case, DL-PRS transmission might just be turned on when needed, according to a default set of DL-PRS configuration parameters, and turned off when not needed.

A UE-initiated on-demand PRS request can be enabled by enhancing an LPP Request Assistance Data message. The UE may send an LPP Request Assistance Data message including the parameters for a desired PRS configuration, such as desired bandwidth, periodicity of PRS, etc. The on-demand PRS request in the LPP Request Assistance Data message may also include a start time and a time duration (or a stop time) for when and how long the requested PRS configuration is required by the UE.

The network may also indicate to the UE one or more possible predefined PRS configurations. Each predefined PRS configuration has a set of associated PRS parameters (e.g., defining bandwidth, duration, power, periodicity, frequency range, muting, etc.) and can be identified by a unique PRS configuration identifier/index. The predefined PRS configurations may be provided to a UE in advance in an LPP Provide Assistance Data message or via broadcast (e.g., positioning SIB(s) (posSIB(s))). The LPP Request Assistance Data message can then include the PRS configuration identifier/index of a desired on-demand PRS configuration (or a list of desired PRS configuration identifications/indices sorted according to priority).

When an LMF receives an LPP Request Assistance Data message for on-demand PRS, the LMF is expected to configure the requested PRS configurations on a number of TRPs/gNBs around the UE location and provide the configured PRS information in an LPP Provide Assistance Data message to the UE. The LPP Provide Assistance Data message may also include an indication for how long the PRS configuration will be available. The UE can then perform the location measurements using the PRS.

Figure 7A:
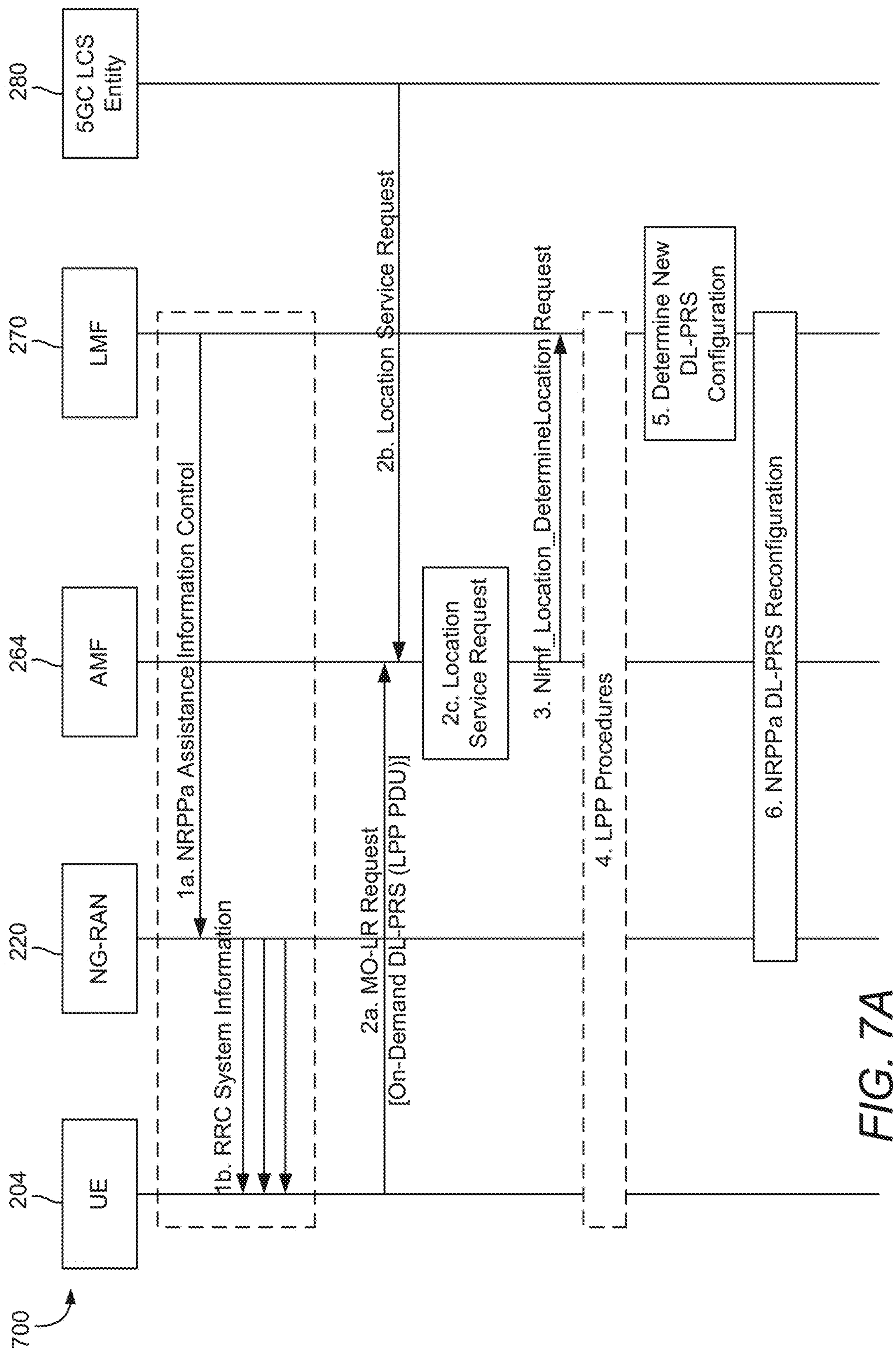
FIGS. 7A and 7B illustrate an example of a location server-initiated on-demand positioning reference signal (PRS) positioning procedure, according to aspects of the disclosure.
Figure 7B:
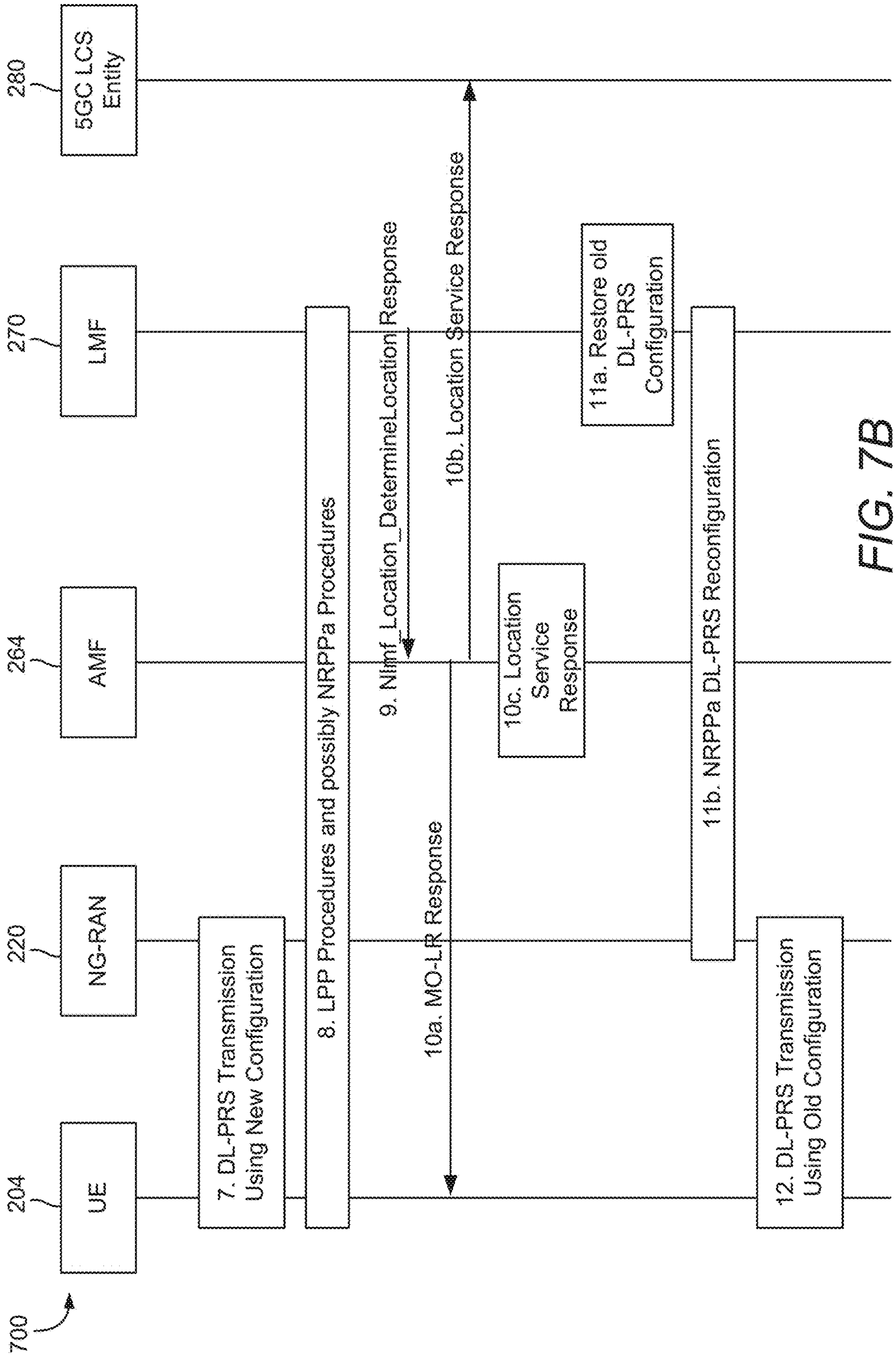

FIGS. 7A and 7B illustrate an example of a location server-initiated on-demand PRS positioning procedure 700, according to aspects of the disclosure. At stage 1 (comprised of stages 1*a* and 1*b*), an LMF 270 may provide one or more positioning SIBs (posSIBs) containing a set of possible on-demand DL-PRS configurations to a gNB in the NG-RAN 220 in an NR positioning protocol type A (NRPPa) Assistance Information Control message for broadcast in positioning system information. The set of possible on-demand DL-PRS configurations may contain a primary DL-PRS configuration (e.g., a default DL-PRS configuration) and one or more secondary DL-PRS configurations, where the secondary DL-PRS configurations define a possible change in DL-PRS compared to the primary DL-PRS configuration (e.g., different bandwidth, duration of positioning occasions and/or frequency of positioning occasions, etc.). Each possible on-demand DL-PRS configuration is associated with a unique identifier. Alternatively, or in addition, a posSIB may also indicate which specific DL-PRS parameters can be requested to be changed on-demand.

At stage 2*a*, the UE 204 sends a mobile-originated location request (MO-LR) request message included in an UL NAS TRANSPORT message to the serving AMF 264 including a request for on-demand DL-PRS transmission. The MO-LR request carries an LPP Request Assistance Data message defining the parameters for a preferred DL-PRS configuration, which may also include a start time and/or a time duration for when and/or how long the requested DL-PRS configuration is required at the UE 204 (e.g., number of seconds, minutes or hours). The request may in addition include an LPP Provide Capabilities message including the DL-PRS capabilities of the UE 204, and an LPP Provide Location Information message (e.g., providing E-CID measurements).

Alternatively, at stage 2*b*, a 5GC LCS entity 280 (e.g., a Gateway Mobile Location Center (GMLC)) requests some location service (e.g. positioning) for a target UE 204 to the serving AMF 264.

Alternatively, at stage 2*c*, the serving AMF 264 for a target UE 204 determines the need for some location service (e.g., to locate the UE 204 for an emergency call).

At stage 3, the AMF 264 invokes the "Nlmf_Location_DetermineLocation" service operation towards the LMF. If stage 2*a* was performed, the service operation includes the MO-LR request from stage 2*a*. If stage 2*b* or 2*c* was performed, the service operation includes the request for the current location of the UE 204, the LCS client type, and may include a required QoS.

At stage 4, the LMF 270 may perform one or more LPP procedures, for example, to obtain the DL-PRS positioning capabilities of the UE.

At stage 5, the LMF 270 determines a new DL-PRS configuration for one or more gNBs in the NG-RAN 220 based on the request received at stage 3. The determination at stage 5 may also be based on location requests from and/or for other UEs nearby to the target UE 204 that are received by the LMF 270 at about the same time.

At stage 6, the LMF 270 instigates an NRPPa DL-PRS Reconfiguration procedure with each of the involved gNBs in the NG-RAN 220 determined at stage 5. If some gNBs indicate that the new DL-PRS configuration cannot be supported, the LMF 270 may perform stage 11 to restore the old DL-PRS configurations in each of the gNBs that indicated the new DL-PRS configuration can be supported in order to avoid interference between gNBs that support the new DL-PRS configuration and gNBs that do not. In this case, the LMF 270 may provide the old DL-PRS configurations to the UE 204 at stage 8 instead of the new DL-PRS configuration(s).

At stage 7, each of the gNBs in the NG-RAN 220 that acknowledged support of a new DL-PRS configuration at stage 6 changes from the old DL-PRS configuration to the new DL-PRS configuration either after (or just before) sending the acknowledgment at stage 6 if no start time was provided or at the start time indicated in stage 6. In some cases, the old DL-PRS configuration may correspond to not transmitting a DL-PRS.

At stage 8, the LMF 270 sends an LPP Provide Assistance Data message to the target UE 204 to provide the new DL-PRS configurations determined at stage 5 and acknowledged at stage 6. This message may also include the start time for each new DL-PRS configuration and a duration. If stage 2*b* or 2*c* was performed, the LMF 270 may instigate LPP and possibly NRPPa procedures to obtain the location of the target UE 204.

At stage 9, the LMF 270 returns an "Nlmf_Location_DetermineLocation" response to the AMF 264. If stage 2*a* was performed, the message indicates whether the DL-PRS Assistance Data have been successfully transferred. If stage 2*b* or 2*c* was performed, the message includes the location of the target UE 204.

At stage 10, if stage 2*a* was performed, the AMF 264 forwards the response from stage 9 to the target UE 204. If stage 2*b* was performed, the AMF 264 forwards the response to the 5GC LCS Entity 280.

At stage 11, if a duration for the new DL-PRS was not included at stage 6, the LMF 270 may instigate an NRPPa DL-PRS Reconfiguration procedure with each of the gNBs determined at stage 5 to restore the old DL-PRS configuration for each gNB.

At stage 12, each of the gNBs begins transmitting the old DL-PRS configuration either when the duration received in stage 6 expires or after receiving and acknowledging the request to restore the old DL-PRS configuration at stage 11. In some cases, the old DL-PRS configuration may correspond to not transmitting a DL-PRS.

In some cases, an LMF may receive on-demand PRS requests for a (possibly large) number of UEs, and each UE may potentially request a different PRS configuration. However, the LMF may have reached the limit of on-demand PRS requests (or generally Assistance Data Requests) it can handle (overload), or the possible PRS transmissions on at least some gNBs may have reached a limit where additional requested PRS transmissions are not possible or not allowed (e.g., by an operator) anymore. Thus, an LMF may not be able to fulfil the on-demand PRS request and would provide an error message to the UE indicating that the UE request cannot be fulfilled.

However, this could result in UEs sending repeated on-demand PRS requests, since the UE may still require the PRS for performing the location measurements, which would then further increase the load of an LMF and other network elements, since an LMF would have to send repeated error messages to the UE until it would finally be able to grant the request. Or a UE may assume the LMF is permanently not able to provide the requested on-demand PRS and may not repeat the request, which however, would mean that not only the current location attempt (which requires PRS) may fail but also possible future location attempts since a UE may not repeat a request for PRS in the future when location measurements using PRS are needed.

The above problems are not specific to an LPP Request Assistance Data message for on-demand PRS, but to any assistance data request from a UE where the LMF is only temporarily unable to grant the request, but may in principle be able to grant the request at a future time.

The present disclosure provides techniques for controlling repeated on-demand PRS requests. As mentioned above, the support of on-demand PRS by an LMF may vary with time (e.g., may not be available when a network is under heavy load but available at other times). Thus, a UE can be allowed to request on-demand PRS at a later time. An LMF might provide a time interval in any failure response after which a UE is allowed to request again. The UE may then repeat the on-demand PRS request at or after that future time. This avoids a UE sending repeated on-demand PRS requests to an LMF (until the request is finally granted) and avoids assuming at the UE that the LMF is permanently not able to grant the request.

The technique described further below is flexible and controlled by an LMF, which would not affect other network entities (i.e., can be supported by UE and LMF upgrades only). It allows an LMF to provide a dedicated "reattempt time" specifically for each UE (e.g., each UE sending an on-demand request which can currently not be granted by the LMF may receive an individual "reattempt time"), which also allows an LMF to schedule the potential future attempts for many UEs not to happen at about the same time. The technique could be applied to other types of assistance data requests as well.

Figure 8A:
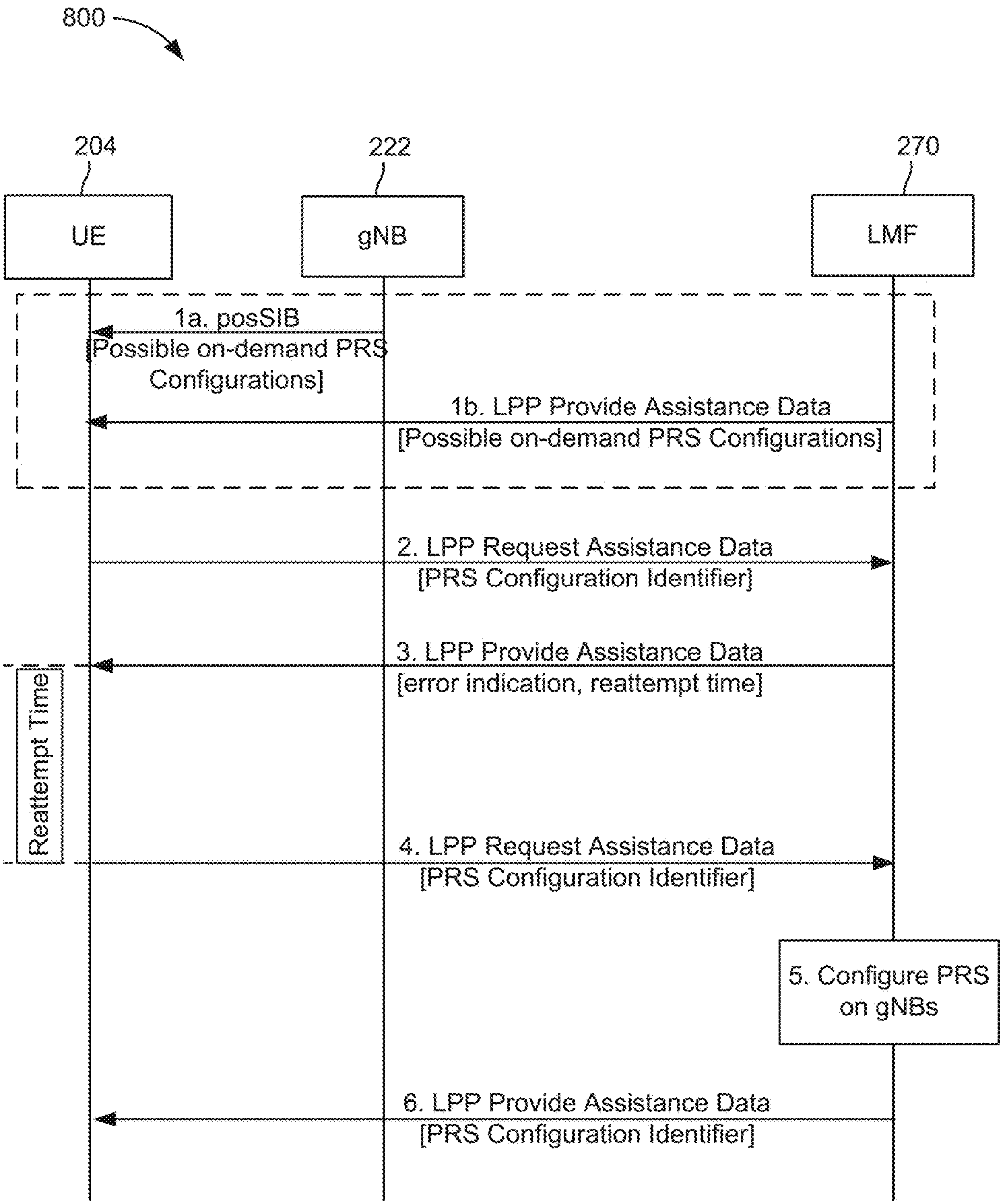
FIG. 8A illustrates an example of an on-demand PRS positioning procedure, according to aspects of the disclosure.

FIG. 8A illustrates an example of an on-demand PRS positioning procedure 800, according to aspects of the disclosure. At stage 1 a, a gNB 222 may broadcast, in one or more posSIBs, multiple PRS configurations that can be requested on-demand. At stage 1*b*, an LMF 270 may provide multiple PRS configurations to the target UE 204 (or other target device) in an LPP Provide Assistance Data message, for example, as part of a location session. Each PRS configuration in stage 1*a* and 1*b* has an associated identifier.

At stage 2, the target UE 204 determines that PRS transmission or a change in PRS transmission is needed (e.g., changed PRS bandwidth, changed duration of PRS occasions, or PRS transmission from more nearby gNBs, etc.) to meet the location requirements and sends an LPP Request Assistance Data message to the LMF 270 to request a change to PRS transmission. The message may include the PRS configuration identifier of the requested PRS configuration from the set of possible PRS configurations provided at stage 1. Alternatively, or in addition, the message may include an indication of which PRS parameters are requested to change (which may include a change to PRS bandwidth, a change of PRS positioning occasions, a change of PRS beams etc.). The message may also include a time duration for how long the (modified) PRS configuration is required at the target UE 204 (e.g., number of seconds, minutes or hours for which the PRS configuration is required).

At stage 3, the LMF 270 is currently not able to fulfil the request and includes an error indication together with a "reattempt time" in an LPP Provide Assistance Data message sent to the target UE 204. The "reattempt time" indicates a future time when the UE 204 is allowed to send the next LPP Request Assistance Data message for on-demand PRS. The "reattempt time" may be provided as an absolute time (e.g., Universal Time Coordinated (UTC) time), or as a number of seconds, minutes, or hours starting at the reception of the LPP Provide Assistance Data message at the UE 204.

At stage 4, after the "reattempt time" occurs (e.g., the UTC time occurs or the number of seconds, minutes, or hours elapses), the UE 204 sends a further LPP Request Assistance Data message to the LMF 270 to request a change to PRS transmission. This may be a repetition of the request at stage 2, or may include a different on-demand PRS request (e.g., a different configuration identifier as in stage 2 or a different time duration for how long the (modified) PRS configuration is required, etc.).

At stage 5, the LMF 270 is now able to fulfill the request from stage 4 and determines a new PRS configuration for one or more gNBs 222 based on the request received at stage 4. The LMF 270 provides the determined PRS configuration information to gNBs 222 that begin broadcasting the new PRS requested by the LMF 270.

At stage 6, the LMF 270 sends an LPP Provide Assistance Data message to the target UE 204 that includes the new PRS configurations determined at stage 5. This message may also include the start time for each new PRS configuration and a duration. The target UE 204 then uses the PRS transmission from the gNBs 222 to perform the desired location measurements and may compute the target UE 204 location based on these measurements.

Figure 8B:
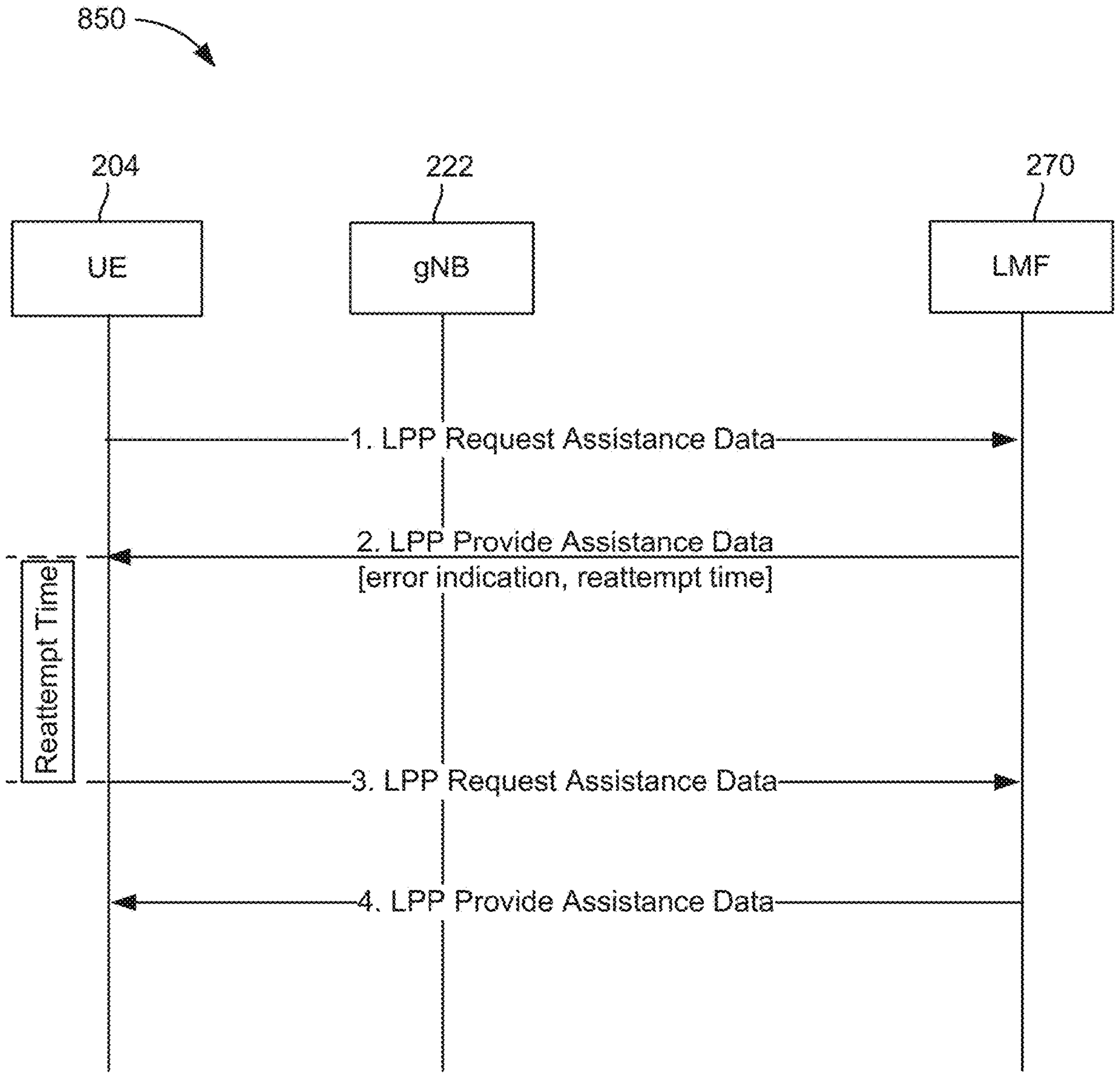
FIG. 8B illustrates an example of a positioning procedure, according to aspects of the disclosure.

FIG. 8B illustrates an example of a positioning procedure 850, according to aspects of the disclosure. Unlike the on-demand PRS positioning procedure 800, the positioning procedure 850 is not specific to on-demand PRS.

At stage 1, the target UE 204 determines that certain positioning assistance data are desired and sends an LPP Request Assistance Data message to the LMF 270. The positioning assistance data may be any assistance data to support a positioning method (e.g., assisted GNSS (A-GNSS), OTDOA, DL-TDOA, DL-AoD, multi-cell RTT, E-CID, real-time kinematics (RTK), state space representation (SSR), WLAN, Bluetooth, or sensors).

At stage 2, the LMF 270 is currently not able to fulfil the request and includes an error indication together with a "reattempt time" in an LPP Provide Assistance Data message sent to the target UE 204. The "reattempt time" indicates a future time when the UE 204 is allowed to send the next LPP Request Assistance Data message. The "reattempt time" may be provided as an absolute time (e.g., Universal Time Coordinated (UTC) time), or as a number of seconds, minutes, or hours starting at the reception of the LPP Provide Assistance Data message at the UE 204.

At stage 3, after the "reattempt time" occurs (e.g., the UTC time occurs or the number of seconds, minutes, or hours elapses), the UE 204 sends a further LPP Request Assistance Data message to the LMF 270 to request assistance data for the positioning method. This may be a repetition of the request at stage 1, or may include a different request (e.g., for a different positioning method).

At stage 4, the LMF 270 sends an LPP Provide Assistance Data message to the target UE 204 that includes the requested assistance data. The target UE 204 then uses the assistance data to perform the desired positioning method.

Referring back to on-demand PRS, in some cases, the LPP Request Assistance Data message (e.g., at stages 2 and 4 of FIG. 8A) may include a request for on-demand PRS for one or more positioning methods that require PRS (e.g., DL-TDOA, DL-AoD, or multi-RTT). A UE may determine different required on-demand PRS configurations for different positioning methods. For example, a UE may request an on-demand PRS configuration specifically for the need to perform DL-AoD measurements from the serving gNB only, and another on-demand PRS configuration specifically for DL-TDOA measurements from several gNBs around the UE's location. An LMF may then provide an error indication and "reattempt time" for each of the positioning methods, as illustrated in FIG. 9 below.

Similarly, in some cases, the LPP Request Assistance Data message (e.g., at stages 1 and 3 of FIG. 8B) may include a request for positioning assistance data for one or more positioning methods (e.g., DL-TDOA, DL-AoD, multi-RTT, GNSS, WLAN, Bluetooth, sensors, etc.). An LMF may then provide an error indication and "reattempt time" for each of the positioning methods.

Different "reattempt times" could also be determined by an LMF for different PRS parameter of a single positioning method. For example, the LPP Request Assistance Data at stage 2 of FIG. 8A may request a PRS configuration for two or more positioning frequency layers (e.g., one PRS in FR1 and one PRS in FR2). The LMF may then provide different "reattempt times" for the requested PRS in FR1 and FR2.

Figure 9:
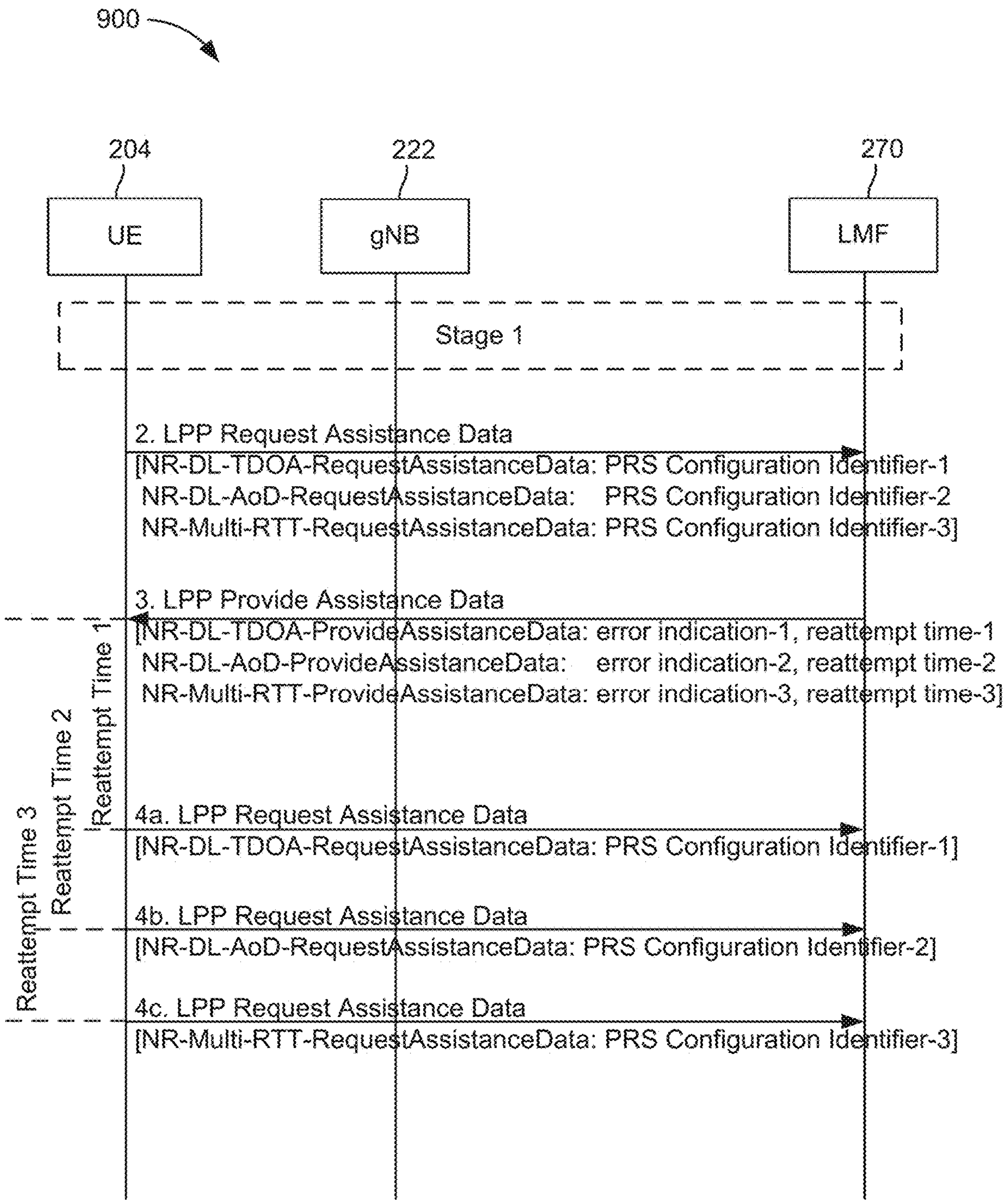
FIG. 9 illustrates an example of an on-demand PRS positioning procedure for multiple positioning methods, according to aspects of the disclosure.

FIG. 9 illustrates an example of an on-demand PRS positioning procedure 900 for multiple positioning methods, according to aspects of the disclosure. Stage 1 of FIG. 9 is the same as stage 1 of FIG. 8A. At stage 2, the target UE 204 determines that PRS transmission or a change in PRS transmission is needed (e.g., changed PRS bandwidth, changed duration of PRS occasions, or PRS transmission from more nearby gNBs, etc.) to meet the location requirements and sends an LPP Request Assistance Data message to the LMF 270 to request a change to PRS transmission. In this case, the UE 204 determines that different on-demand PRS configurations are needed for different positioning methods. The message therefore includes PRS configuration identifiers of requested PRS configurations from the set of possible PRS configurations provided at stage 1 for different positioning methods (e.g., DL-TDOA, DL-AoD, multi-RTT). The message may also include a time duration for how long the (modified) PRS configurations are required at the target UE 204 (e.g., number of seconds, minutes or hours for which the PRS configuration is required).

At stage 3, the LMF 270 is currently not able to fulfil the request and includes an error indication together with a "reattempt time" in an LPP Provide Assistance Data message sent to the target UE 204. The message includes a "reattempt time" for each requested PRS configuration/positioning method.

At stage 4*a*, after the "reattempt time" for the DL-TDOA positioning method occurs, the UE 204 sends a further LPP Request Assistance Data message to the LMF 270 to request a change to PRS transmission for a DL-TDOA positioning method. This may be a repetition of the request at stage 2 for the DL-TDOA positioning method, or may include a different on-demand PRS request (e.g., a different configuration identifier as in stage 2 or a different time duration for how long the (modified) PRS configuration is required, etc.).

At stage 4*b*, after the "reattempt time" for the DL-AoD positioning method occurs, the UE 204 sends a further LPP Request Assistance Data message to the LMF 270 to request a change to PRS transmission for a DL-AoD positioning method. This may be a repetition of the request at stage 2 for the DL-AoD positioning method, or may include a different on-demand PRS request (e.g., a different configuration identifier as in stage 2 or a different time duration for how long the (modified) PRS configuration is required, etc.).

At stage 4*c*, after the "reattempt time" for the multi-RTT positioning method occurs, the UE 204 sends a further LPP Request Assistance Data message to the LMF 270 to request a change to PRS transmission for a multi-RTT positioning method. This may be a repetition of the request at stage 2 for the multi-RTT positioning method, or may include a different on-demand PRS request. Note that in the example of FIG. 9, the three "reattempt times" are different. However, that need not be the case and they may instead be the same.

Stages 5 and 6 of FIG. 8A would now be performed. For the sake of brevity, they are not repeated here.

There are different variants of the above techniques, including the following. As a first variant, (referred to as "Variant A"), the "reattempt time" is provided at stage 1*a* of FIG. 8A/9 in advance in the broadcast message. In this case, the LPP Provide Assistance Data at stage 3 of FIG. 8A/9 would include only an error indication. The UE uses the "reattempt time" from stage 1*a* of FIG. 8A/9 to decide when to perform the reattempt at stage 4 of FIG. 8A/9. However, in this case, all UEs receiving the broadcast message in a cell would use the same value for the "reattempt time." That is, the LMF cannot provide a dedicated "reattempt time" for individual UEs.

As a second variant (referred to as "Variant B"), the "reattempt time" is provided at stage 1*b* of FIG. 8A/9 in advance in the LPP Provide Assistance Data message together with the possible on-demand PRS configurations. Similar to Variant A above, the LPP Provide Assistance Data at stage 3 of FIG. 8A/9 would include only an error indication. The UE uses the 'reattempt time' from stage 1*b* of FIG. 8A/9 to decide when to perform the reattempt at stage 4 of FIG. 8A/9. Compared to Variant A, the "reattempt time" can now be dedicated for each UE, since the LPP Provide Assistance Data message is a UE-dedicated message. Therefore, different UEs in the network could receive different "reattempt times," for example, to distribute the reattempts from several UEs over time.

Both Variants A and B would require a preconfiguration of the "reattempt time." However, the actual load of an LMF when an on-demand PRS request actually happens at stage 2 of FIG. 8A/9 may be different and may allow a shorter or may require a longer "reattempt time" as preconfigured at stage 1 of FIG. 8A/9. Thus, providing the "reattempt time" in a failure message at stage 3 of FIG. 8A/9 would be the most flexible solution.

As a third variant (referred to as "Variant C"), the LMF provides two timer values to the UE at stage 3 of FIG. 8A/9 or stage 2 of FIG. 8B: a first timer $T_1$, indicating when the UE can repeat the current request, and a second timer $T_2$, indicating when the UE can send further assistance data requests (e.g., on-demand PRS requests as in FIGS. 8A and 9). The LMF would then store the UE assistance data request from stage 2 of FIG. 8A/9 or stage 1 of FIG. 8B. After $T_1$, the UE may perform stage 4 of FIG. 8A/9 or stage 3 of FIG. 8B without including any specific information on the requested PRS (or other assistance data). The LMF would then use the stored information for this UE to determine the specific assistance data requested. This-variant has the advantage that the message at stage 4 of FIG. 8A/9 and stage 3 of FIG. 8B can now be a very small message, essentially without information content, since the assistance data request details refer now to the previous or original assistance data request from stage 2 of FIG. 8A/9 or stage 1 of FIG. 8B stored at the LMF. The LMF would erase the original stored assistance data request after $T_1$.

If the UE requires different assistance data than the original data requested at stage 2 of FIG. 8A/9 or stage 1 of FIG. 8B, the UE would perform stage 4 of FIG. 8A/9 or stage 3 of FIG. 8B after the provided time $T_2$. This variant allows very short repeated assistance data request messages, which may be advantageous in the case stage 4 of FIG. 8A/9 or stage 3 of FIG. 8B is transported using lower layer signaling (e.g., Layer-1 or Layer-2 signaling). However, it would require storage of assistance data requests for (potentially many) UEs at the LMF.

As a fourth variant (referred to as "Variant D"), the UE performs stage 2 of FIG. 8A/9 or stage 1 of FIG. 8B including a start time and duration or stop time for when/how long the assistance data (e.g., on-demand PRS in the case of FIGS. 8A and 9) is requested. The LMF then provides two timer values to the UE at stage 3 of FIG. 8A/9 or stage 2 of FIG. 8B: a first time $T_1$—which is greater than the requested start time, but less than the stop time—indicating the time when the LMF expects to be able to fulfill the assistance data request; and a second time $T_2$, indicating the earliest time when the UE is permitted to send the next assistance data request.

The LMF may then perform stage 6 of FIG. 8A or stage 4 of FIG. 8B when time $T_1$ occurs and the UE would not perform stage 4 of FIG. 8A/9 or stage 3 of FIG. 8B, but instead wait for occurrence of stage 6 of FIG. 8A or stage 4 of FIG. 8B. If stage 6 of FIG. 8A or stage 4 of FIG. 8B does not occur after $T_1$, the UE may perform stage 4 of FIG. 8A/9 or stage 3 of FIG. 8B after $T_2$. As an alternative variant (referred to as "Variant D1"), the LMF does not store information for individual UE requests at stage 2 of FIG. 8A!9 or stage 1 of FIG. 8B and thus does not perform stage 6 of FIG. 8A or stage 4 of FIG. 8B. Instead, the LMF accumulates information applicable to requests from one or many UEs and, when able, reconfigures PRS for the UE(s) (in the case of FIGS. 8A and 9). In this case, time $T_1$ indicates to each UE when the reconfiguration is likely to occur. A UE discovers the reconfiguration by monitoring PRS configuration information (or other assistance information for non-on-demand PRS methods) conveyed in posSIB broadcast messages (e.g., as at stage 1 of FIG. 8A/9). Thus, a UE can begin posSIB monitoring after the time $T_1$ occurs and would only repeat the on demand PRS request (or other assistance data request) after time $T_2$ if no reconfiguration is observed.

Compared to Variant C, this variant (particularly Variant D1) would not require storage of assistance data requests (e.g., on-demand requests) at an LMF and can avoid stage 4 of FIG. 8A/9 or stage 3 of FIG. 8B altogether, but would need an LMF to be able to fulfil the request within the duration requested at stage 2 of FIG. 8A/9 or stage 1 of FIG. 8B.

On the UE side, there are various conditions that may trigger a UE to request on-demand PRS. For example, the triggering criteria may include a threshold for the measurement quality, a confidence level, a change in radio conditions, etc. In some cases, the QoS in an LIP Request Location Information message can trigger a UE to send a request for on-demand PRS. However, more specific triggering criteria should be defined.

As a first technique described herein, a Boolean flag can be added in the NRPPa Assistance Information Control message at stage 1*a* of FIG. 7A or a new location request at stage 2. The Boolean flag may control whether, for a specific session or time-period, the UE is allowed to request on-demand configurations for a given positioning session (a value of "true") or the UE is not allowed to request on-demand configurations for a given positioning session (a value of "false"). This will allow the LMF and/or gNB to prevent the UE from bombarding the network with on-demand configuration requests per session.

As a second technique, a bitmap (e.g., eight bits) can be used to negotiate which PRS configuration parameters can be used between the UE and the LMF for on-demand requests. For example, the first bit of the bitmap can indicate whether the UE is permitted to request a change to the PRS bandwidth, the second bit a change to the comb/symbol option, the third bit a change to the PRS periodicity, the fourth bit a change to the number of repetitions, the fifth bit a reduction in the number of TRPs, and the sixth bit a reduction in the number of positioning frequency layers. The remaining bits (e.g., two bits for an eight-bit bitmap) may be reserved for other purposes. The UE can send its bitmap request in the LPP Provide Capabilities message at stage 520 of FIG. 5. The LMF can include a similar bitmap in the LPP Provide Assistance Data message at stage 530 of FIG. 5 to indicate to the UE which PRS configuration parameters may be requested to be changed. This will ensure that the UE is not requesting changes to parameters that are not supported by the LMF and/or gNB.

As a third technique, the maximum number of requests that the UE can make for a given on-demand PRS configuration can be defined. The LMF can configure this value to the UE in the LPP Provide Assistance Data message. UEs with different capabilities can be given different retry values. More specifically, UEs may be classified as low-tier UEs (e.g., wearables, such as smart watches, glasses, rings, etc.) and premium UEs (e.g., smartphones, tablet computers, laptop computers, etc.). Low-tier UEs may alternatively be referred to as reduced-capability NR UEs, reduced-capability UEs ("RedCap" UEs), NR light UEs, light UEs, NR super light UEs, or super light UEs. Premium UEs may alternatively be referred to as fill-capability UEs or simply UEs. Low-tier UEs generally have lower baseband processing capability, fewer antennas (e.g., one receiver antenna as baseline in FR1 or FR2, two receiver antennas optionally), lower operational bandwidth capabilities (e.g., 20 MHz for FR1 with no supplemental uplink or carrier aggregation, or 50 or 100 MHz for FR2), only half duplex frequency division duplex (HD-FDD) capability, smaller HARQ buffer, reduced physical downlink control channel (PDCCH) monitoring, restricted modulation (e.g., 64 QAM for downlink and 16 QAM for uplink), relaxed processing timeline requirements, and/or lower uplink transmission power compared to premium UEs. Different UE tiers can be differentiated by UE category and/or by UE capability. For example, certain types of UEs may be assigned a classification (e.g., by the original equipment manufacturer (OEM), the applicable wireless communications standards, or the like) of "low-tier" and other types of UEs may be assigned a classification of "premium." Certain tiers of UEs may also report their type (e.g., "low-tier" or "premium") to the network. Additionally, certain resources and/or channels may be dedicated to certain types of UEs. Regarding the number of requests for a given PRS configuration, a "premium" UE can be given a higher retry value than a RedCap UE, for example.

As a fourth technique, the maximum time that a UE should wait for the first on-demand PRS transmission or for a response to the on-demand request can be defined. If the UE does not receive a response to the request or does not detect any on-demand PRS transmission (e.g., from the requested TRP(s), on the requested positioning frequency layer(s), at the requested time(s), etc.), then the UE has two options. As a first option, the UE can assume that the on-demand request has failed and move to a different positioning method (e.g., a non-NR positioning method). As a second option, the UE can send a message to the LMF informing it of this error. The UE may perform one or both of these options.

As an alternative technique, the indicated time may be the maximum time that the UE should allow for the NR positioning method requiring the on-demand PRS configuration before switching to another positioning method. In an aspect, the UE can inform the LMF how much time the UE will wait for the LMF to send a response to the request or the on-demand configuration. This technique is applicable to either Uu positioning (i.e., the UE receives PRS from one or more TRPs) or sidelink positioning (i.e., the UE receives PRS from one or more UEs). For sidelink positioning, one UE would send the on-demand request and another UE would respond with a configuration.

The present disclosure further provides techniques for a positioning status update to indicate the need for a specific assistance data configuration (i.e., a specific PRS configuration). There may be multiple PRS configurations supported by the LMF in a given geographic area, but at a given time, only a few (one or more) configurations will be activated. In this technique, a new posSIB can be used to broadcast the active configuration index(es) for the active PRS configuration(s) from the gNB/LMF. Note that this is only the active configuration index, not the full PRS configuration—the full PRS configurations may have been previously signaled to the UE(s) in the area via other posSIB(s) or unicast signaling. The new posSIB(s) will provide the information for all of the PRS configurations activated at the current time. The new posSIB(s) may also provide the length of time for which a PRS configuration will be activated.

By decoding the posSIB(s), the UE will be able to determine whether or not one or more of the activated PRS configurations are useful for positioning. If at least one of the activated configurations are useful, the UE can start a positioning session normally. If none of the activated configurations are useful, the UE will not start a positioning session. This will save a significant amount of signaling between the UE and the network that would otherwise be consumed negotiating an on-demand PRS configuration.

Where the UE does not start a positioning session, the UE should indicate the cause to the network (i.e., the reason why it is not able to start the positioning session) in a positioning status update message. For example, the UE may indicate that the required assistance data (i.e., the required PRS configuration) is not activated, and may also indicate what the required assistance data is. The UE should continue monitoring the posSIB(s) for any changes in the activated PRS configurations.

Figure 10:
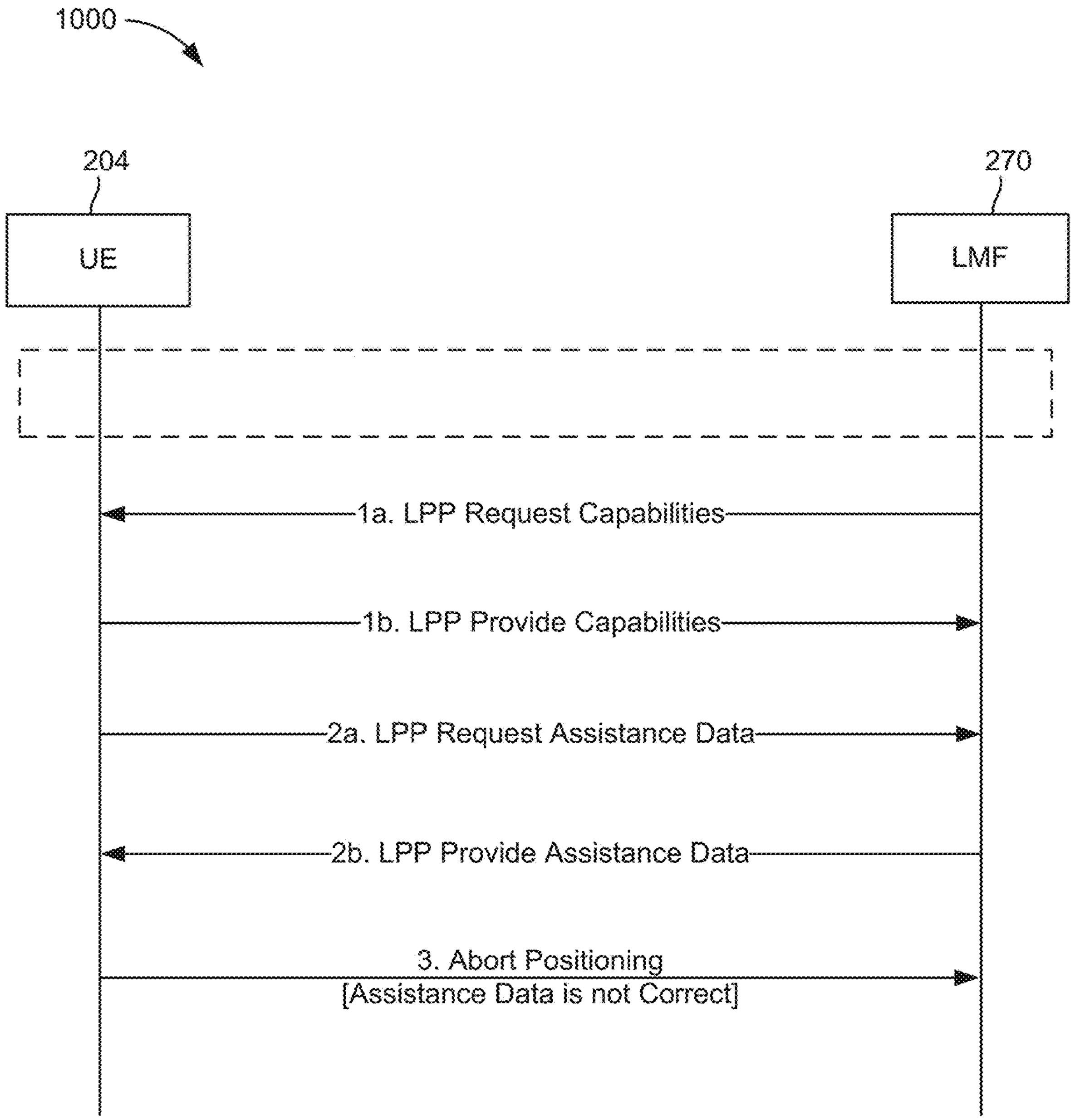
FIG. 10 illustrates an example method for aborting a positioning session because of incorrect or insufficient assistance data according to current practice.

FIG. 10 illustrates an example method 1000 for aborting a positioning session because of incorrect or insufficient assistance data according to current practice. Stages 1*a* and 1*b* are the same as stages 510 and 520 of FIG. 5, and stage 2*b* is the same as stage 530 of FIG. 5. At stage 2*a*, the UE 204 sends an LPP Request Assistance Data message to the LMF 270. The request may include a specific PRS configuration that the UE needs for the positioning session. At stage 2*b*, the LMF 270 sends an LPP Provide Assistance Data message to the UE 204. The response may include a PRS configuration that is different than the requested configuration and that the UE 204 is unable to use for the positioning session (e.g., due to the UE's capabilities). As such, at stage 3, the UE 204 sends an LPP Abort Positioning message to the LMF 270 indicating that the assistance data is not correct.

Figure 11:
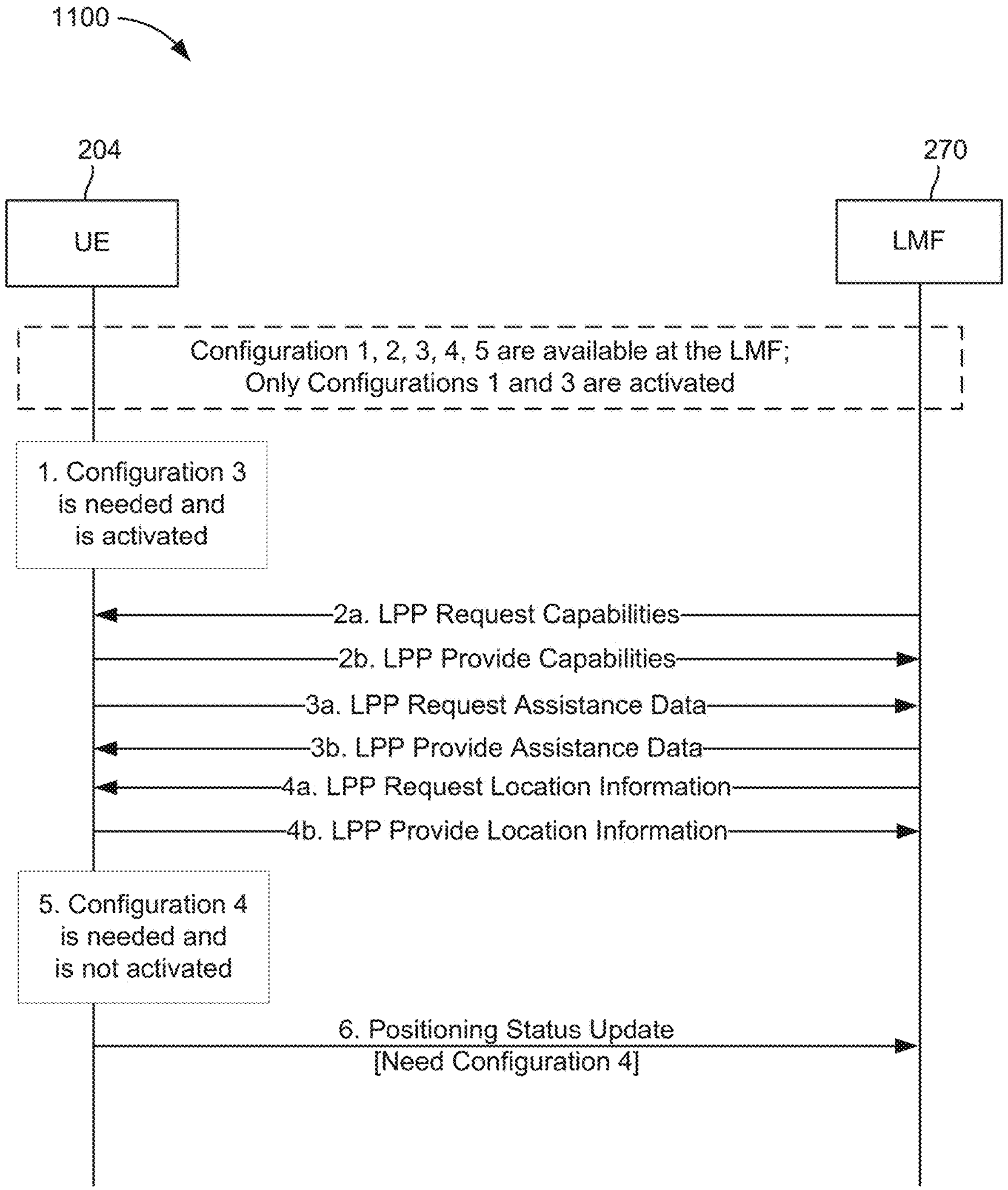
FIG. 11 illustrates an example method of reporting the requirement for a new PRS configuration according to aspects of the disclosure.

FIG. 11 illustrates an example method 1100 of reporting the requirement for a new PRS configuration according to aspects of the disclosure. In the example of FIG. 11, there are five PRS configurations available to an LMF 270 (indexed "1," "2," "3," "4," and "5"). The different PRS configurations may be for different sets of one or more TRPs, different sets of one or more positioning frequency layers, different frequency bands, different sets of BWPs, and/or the like. In the example of FIG. 11, configurations 1 and 3 are currently activated. The available PRS configurations and identifiers of the currently activated configurations may be broadcasted by the UE's 204 serving gNB in one or more posSIBs, as described above.

At stage 1, the UE 204 initiates a first positioning session and, based on the broadcasted posSIB(s), determines that it needs configuration 3 and that configuration 3 is activated. At stages 2*a* to 4*b* the UE 204 and the LMF 270 perform an LPP positioning session, as described above with reference to FIG. 5. At stage 5, the UE 204 initiates a second positioning session. The second positioning session may be the same or a different type of positioning session than the first positioning session. For this positioning session, the UE 204 needs a different PRS configuration, specifically, configuration 4. This may be because the UE 204 needs to measure more, fewer, or different TRPs, more, fewer, or different frequency layers, and/or the like. However, in the example of FIG. 11, configuration 4 is not currently activated. As such, at stage 6, the UE 204 sends a Positioning Status Update message to the LMF 270 that indicates that the UE 204 needs configuration 4 for the second positioning session. In response, the LMF 270 may or may not activate configuration 4, and therefore, the UE 204 may wait some period of time for a response from the LMF 270 or an indication that configuration 4 has been activated (e.g., via the posSIB) before aborting the second positioning session.

The present disclosure provides further techniques for indicating PRS configuration capabilities. As noted above, a gNB and/or LMF may support multiple PRS configurations in given geographic area. In an aspect, a UE can request a specific on-demand PRS configuration. The network can accept the request and activate the new configuration, or the network can reject the request and provide a timer, or future time, to the UE. The UE should not request this specific PRS configuration until expiration of the timer or the indicated future time.

In an aspect, a UE may provide a capability (e.g., in the LPP Provide Capabilities message) indicating how many PRS configurations the UE can store simultaneously. The UE can maintain a configuration timer for each of the configurations, or one timer that applies to all of the configurations. The LMF can simultaneously provide the number of configurations at the beginning of a positioning session.

The present disclosure provides further techniques for on-demand rules based on UE category. The following table indicates the DL-PRS pre-configuration associated with the QoS and radio conditions.

TABLE 2

| QoS Requirement/Radio Condition | Pre-Configured PRS Configuration |
|---|---|
| A: High accuracy and low latency positioning | #1: Configuration with large bandwidth and short periodicity |
| B: Medium accuracy and latency positioning | #2: Configuration with medium bandwidth and periodicity |
| C: Low accuracy and high latency positioning | #3: Configuration with small bandwidth and large periodicity |
| D: Positioning with large uplink/downlink path loss | #4: Configuration with large power |

As noted above, an LMF may support multiple PRS configurations. Some of them can be used for positioning sessions requiring high positioning accuracy, some of them can be used for positioning sessions requiring low latency, and some of them can be used for positioning sessions requiring low power usage. The PRS configuration that a UE can request may be based on the category and capabilities of the UE. For example, a premium UE may be permitted to request a high accuracy, low latency, and low power configuration compared to the currently activated PRS configuration(s). A normal UE may only be permitted to request low latency and low power configurations compared to the currently activated configurations. An industrial IoT (IIoT) or low-tier UE may only be permitted to request low power PRS configurations compared to the currently activated configurations. These rules can be defined in the applicable wireless standard or can be set by the LMF based on UE capabilities and then provided in assistance data (e.g., at stage 530 of FIG. 5).

Figure 12:
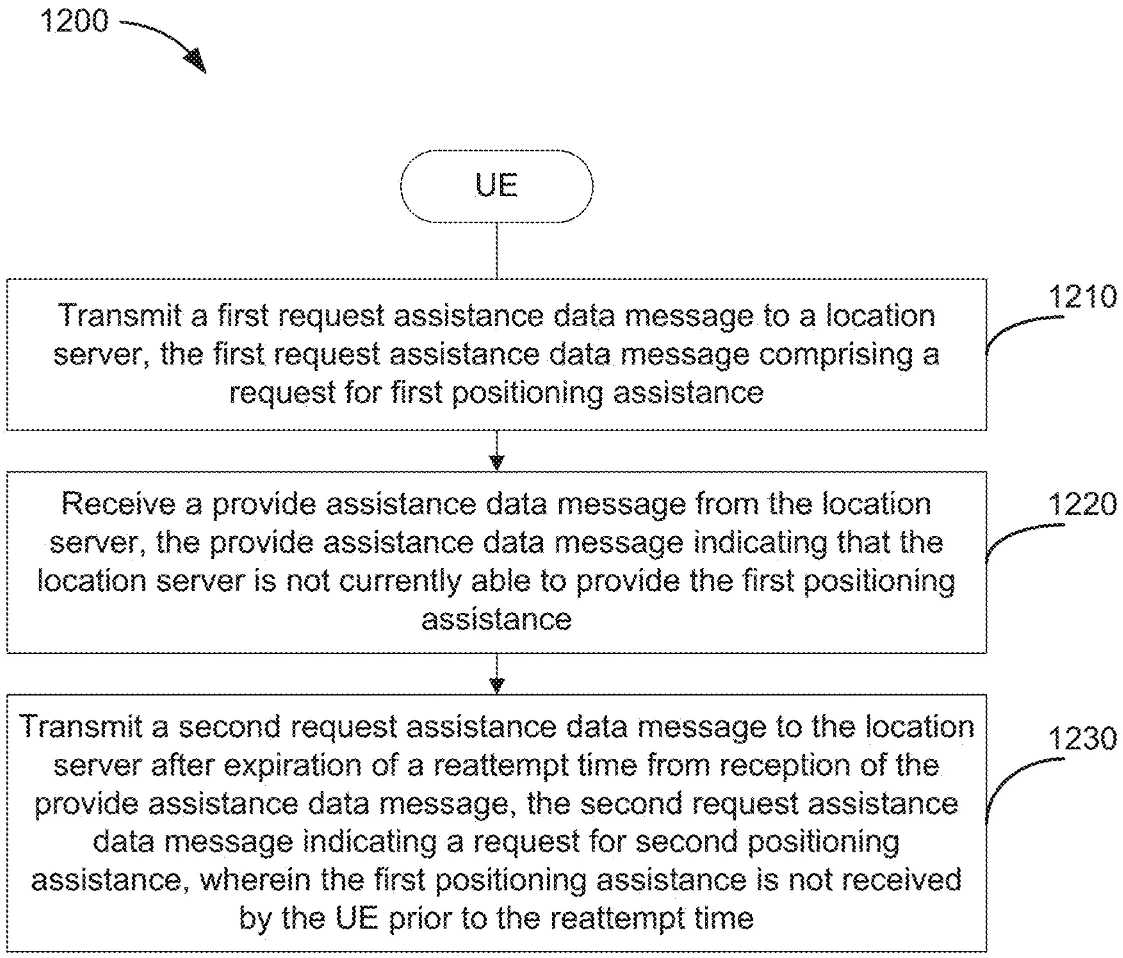
FIGS. 12 and 13 illustrate example methods of positioning, according to aspects of the disclosure.

FIG. 12 illustrates an example method 1200 of wireless positioning, according to aspects of the disclosure. In an aspect, method 1200 may be performed by a UE (e.g., any of the UEs described herein).

At 1210, the UE transmits a first request assistance data message to a location server (e.g., LMF 270), the first request assistance data message comprising a request for first positioning assistance, as, for example, at stage 2 of FIG. 8A or stage 1 of FIG. 8B. In an aspect, operation 1210 may be performed by the one or more WWAN transceivers 310, the one or more processors 332, memory 340, and/or positioning component 342 any or all of which may be considered means for performing this operation.

At 1220, the UE receives a provide assistance data message from the location server, the provide assistance data message indicating that the location server is not currently able to provide the first positioning assistance, as, for example, at stage 3 of FIG. 8A or stage 2 of FIG. 8B. In an aspect, operation 1220 may be performed by the one or more WWAN transceivers 310, the one or more processors 332, memory 340, and/or positioning component 342, any or all of which may be considered means for performing this operation.

At 1230, the UE transmits a second request assistance data message to the location server after expiration of a reattempt time from reception of the provide assistance data message, the second request assistance data message indicating a request for second positioning assistance, wherein the first positioning assistance is not received by the UE prior to the reattempt time, as, for example, at stage 4 of FIG. 8A or stage 3 of FIG. 8B. In an aspect, operation 1230 may be performed by the one or more WWAN transceivers 310, the one or more processors 332, memory 340, and/or positioning component 342, any or all of which may be considered means for performing this operation.

As will be appreciated, a technical advantage of the method 1200 is the prevention of multiple requests for assistance data that cannot be serviced by the network.

Figure 13:
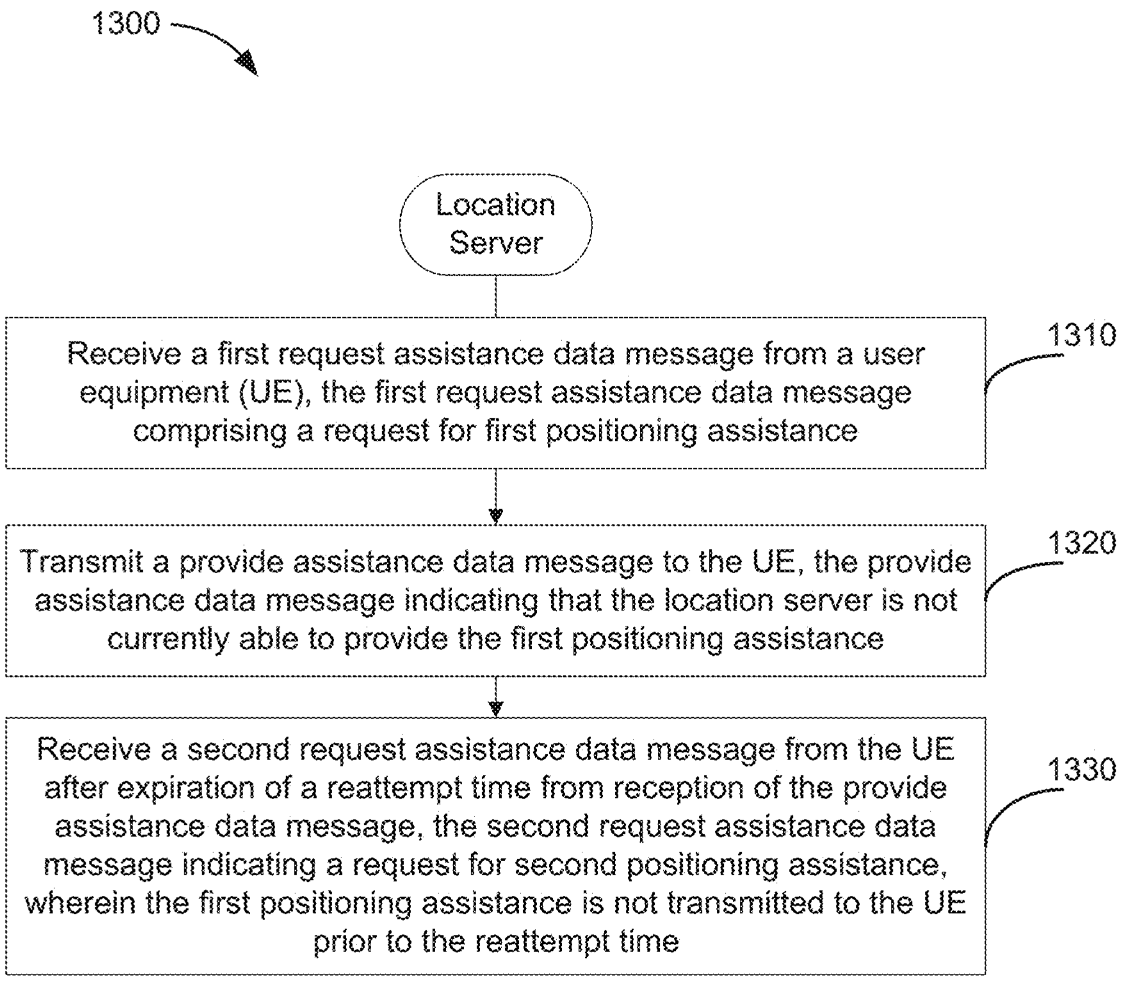

FIG. 13 illustrates an example method 1300 of positioning, according to aspects of the disclosure. In an aspect, method 1300 may be performed by a location server (e.g., LMF 270).

At 1310, the location server receives a first request assistance data message from a UE (e.g., any of the UEs described herein), the first request assistance data message comprising a request for first positioning assistance, as, for example, at stage 2 of FIG. 8A or stage 1 of FIG. 8B. In an aspect, operation 1310 may be performed by the one or more network transceivers 390, the one or more processors 394, memory 396, and/or positioning component 398, any or all of which may be considered means for performing this operation.

At 1320, the location server transmits a provide assistance data message to the UE, the provide assistance data message indicating that the location server is not currently able to provide the first positioning assistance, as, for example, at stage 3 of FIG. 8A or stage 2 of FIG. 8B. In an aspect, operation 1320 may be performed by the one or more network transceivers 390, the one or more processors 394, memory 396, and/or positioning component 398, any or all of which may be considered means for performing this operation.

At 1330, the location server receives a second request assistance data message from the UE after expiration of a reattempt time from reception of the provide assistance data message, the second request assistance data message indicating a request for second positioning assistance, wherein the first positioning assistance is not transmitted to the UE prior to the reattempt time, as, for example, at stage 4 of FIG. 8A or stage 3 of FIG. 8B. In an aspect, operation 1330 may be performed by the one or more network transceivers 390, the one or more processors 394, memory 396, and/or positioning component 398, any or all of which may be considered means for performing this operation.

As will be appreciated, a technical advantage of the method 1300 is the prevention of multiple requests for assistance data that cannot be serviced by the network.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a user equipment (UE), comprising: transmitting a first request assistance data message to a location server, the first request assistance data message comprising a request for first positioning assistance; receiving a provide assistance data message from the location server, the provide assistance data message indicating that the location server is not currently able to provide the first positioning assistance; and transmitting a second request assistance data message to the location server after expiration of a reattempt time from reception of the provide assistance data message, the second request assistance data message indicating a request for second positioning assistance, wherein the first positioning assistance is not received by the UE prior to the reattempt time.

Clause 2. The method of clause 1, wherein each of the first positioning assistance and the second positioning assistance comprise assistance data for one or more positioning methods.

Clause 3. The method of clause 2, wherein the one or more positioning methods include: assisted global navigation satellite system (A-GNSS), observed time-difference of arrival (OTDOA), downlink time-difference of arrival (DL-TDOA), downlink angle-of-departure (DL-AoD), multi-cell round-trip-time (RTT), enhanced cell identity (E-CID), real-time kinematic (RTK), state space representation (SSR), wireless local area network (WLAN), Bluetooth, sensors, or any combination thereof.

Clause 4. The method of any of clauses 1 to 3, wherein the first positioning assistance comprises a first on-demand positioning reference signal (PRS) configuration, wherein the second positioning assistance comprises a second on-demand PRS configuration.

Clause 5. The method of clause 4, further comprising: transmitting one or more parameters for the first on-demand PRS configuration in the first request assistance data message; and transmitting one or more parameters for the second on-demand PRS configuration in the second request assistance data message.

Clause 6. The method of any of clauses 4 to 5, further comprising: receiving a plurality of on-demand PRS configurations that can be activated to support positioning of the UE, wherein the first on-demand PRS configuration and the second on-demand PRS configuration are each members of the plurality of on-demand PRS configurations.

Clause 7. The method of clause 6, further comprising: receiving the plurality of on-demand PRS configurations from the location server in one or more provide assistance data messages; or receiving the plurality of on-demand PRS configurations by broadcast from a base station in one or more positioning system information blocks (posSIBs).

Clause 8. The method of any of clauses 4 to 7, wherein: the second on-demand PRS configuration is the same as the first on-demand PRS configuration, or the second on-demand PRS configuration is different from the first on-demand PRS configuration.

Clause 9. The method of any of clauses 4 to 8, further comprising: receiving a second provide assistance data message from the location server, the second provide assistance data message indicating at least that the location server activated the second on-demand PRS configuration.

Clause 10. The method of any of clauses 4 to 9, wherein: the first on-demand PRS configuration is for a first type of positioning method between the UE and the location server, the first request assistance data message further includes a third identifier of a third on-demand PRS configuration, and the third on-demand PRS configuration is for a second type of positioning method between the UE and the location server.

Clause 11. The method of any of clauses 4 to 10, wherein: the first request assistance data message further includes a start time and a duration for the first on-demand PRS configuration, the provide assistance data message further includes a fulfillment time that is greater than the start time and less than the duration and indicates when the location server expects to be able to activate the first on-demand PRS configuration, and the method further comprising: determining that the first on-demand PRS configuration has been activated prior to or at the fulfillment time; and refraining from transmitting the second request assistance data message to the location server after expiration of the reattempt time from reception of the provide assistance data message based on determining that the first on-demand PRS configuration has been activated.

Clause 12. The method of clause 11, further comprising: determining that the first on-demand PRS configuration has been activated based on monitoring system information from a base station.

Clause 13. The method of any of clauses 1 to 12, further comprising: receiving the reattempt time in the provide assistance data message; receiving the reattempt time from a base station in system information; or receiving the reattempt time in a prior provide assistance data message received before transmission of the first request assistance data message.

Clause 14. The method of any of clauses 1 to 13, wherein the reattempt time is: an absolute time, a number of seconds, a number of minutes, or a number of hours.

Clause 15. The method of any of clauses 1 to 14, further comprising: receiving a second time from the location server in the provide assistance data message, the second time indicating a time by which the location server expects to provide the second positioning assistance to the UE.

Clause 16. The method of clause 15 further comprising: receiving the second positioning assistance via broadcast from one or more gNBs prior to the second time; or receiving the second positioning assistance in a second provide assistance message prior to the second time.

Clause 17. The method of any of clauses 15 to 16, wherein the second time occurs before the reattempt time, the method further comprising: verifying the first positioning assistance is not received prior to the second time; and transmitting the second request assistance data message to the location server after expiration of the reattempt time from reception of the provide assistance data message based on not receiving the first positioning assistance prior to the second time.

Clause 18. The method of any of clauses 1 to 17, wherein the second request assistance data message indicates that the second request assistance data message is a repetition of the first request assistance data message.

Clause 19. A method of positioning performed by a location server, comprising: receiving a first request assistance data message from a user equipment (UE), the first request assistance data message comprising a request for first positioning assistance; transmitting a provide assistance data message to the UE, the provide assistance data message indicating that the location server is not currently able to provide the first positioning assistance; and receiving a second request assistance data message from the UE after expiration of a reattempt time from reception of the provide assistance data message, the second request assistance data message indicating a request for second positioning assistance, wherein the first positioning assistance is not transmitted to the UE prior to the reattempt time.

Clause 20. The method of clause 19, wherein: each of the first positioning assistance and the second positioning assistance comprise assistance data for one or more positioning methods, and the one or more positioning methods include: assisted global navigation satellite system (A-GNSS), observed time-difference of arrival (OTDOA), downlink time-difference of arrival (DL-TDOA), downlink angle-of-departure (DL-AoD), multi-cell round-trip-time (RTT), enhanced cell identity (E-CID), real-time kinematic (RTK), state space representation (SSR), wireless local area network (WLAN), Bluetooth, sensors, or any combination thereof.

Clause 21. The method of any of clauses 19 to 20, wherein the first positioning assistance comprises a first on-demand positioning reference signal (PRS) configuration, wherein the second positioning assistance comprises a second on-demand PRS configuration.

Clause 22. The method of clause 21, further comprising: receiving one or more parameters for the first on-demand PRS configuration in the first request assistance data message; and receiving one or more parameters for the second on-demand PRS configuration in the second request assistance data message.

Clause 23. The method of any of clauses 21 to 22, further comprising: transmitting, to the UE, a plurality of on-demand PRS configurations that can be activated to support positioning of the UE, wherein the first on-demand PRS configuration and the second on-demand PRS configuration are each members of the plurality of on-demand PRS configurations.

Clause 24. The method of any of clauses 21 to 23, further comprising: transmitting a second provide assistance data message to the UE, the second provide assistance data message indicating at least that the location server activated the second on-demand PRS configuration.

Clause 25. The method of any of clauses 21 to 24, wherein: the first request assistance data message further includes a start time and a duration for the first on-demand PRS configuration, the provide assistance data message further includes a fulfillment time that is greater than the start time and less than the duration and indicates when the location server expects to be able to activate the first on-demand PRS configuration.

Clause 26. The method of any of clauses 19 to 25, further comprising: transmitting the reattempt time in the provide assistance data message; or transmitting the reattempt time in a prior provide assistance data message transmitted before transmission of the first request assistance data message.

Clause 27. The method of any of clauses 19 to 26, further comprising: transmitting a second time to the UE in the provide assistance data message, the second time indicating a time by which the location server expects to provide the second positioning assistance to the UE.

Clause 28. The method of clause 27, further comprising: transmitting the second positioning assistance in a second provide assistance message prior to the second time.

Clause 29. A user equipment (UE), comprising: a memory; at least one transceiver; and at least one processor communicatively coupled to the memory and the at least one transceiver, the at least one processor configured to: transmit, via the at least one transceiver, a first request assistance data message to a location server, the first request assistance data message comprising a request for first positioning assistance; receive, via the at least one transceiver, a provide assistance data message from the location server, the provide assistance data message indicating that the location server is not currently able to provide the first positioning assistance; and transmit, via the at least one transceiver, a second request assistance data message to the location server after expiration of a reattempt time from reception of the provide assistance data message, the second request assistance data message indicating a request for second positioning assistance, wherein the first positioning assistance is not received by the UE prior to the reattempt time.

Clause 30. The UE of clause 29, wherein each of the first positioning assistance and the second positioning assistance comprise assistance data for one or more positioning methods.

Clause 31. The UE of clause 30, wherein the one or more positioning methods include: assisted global navigation satellite system (A-GNSS), observed time-difference of arrival (OTDOA), downlink time-difference of arrival (DL-TDOA), downlink angle-of-departure (DL-AoD), multi-cell round-trip-time (RTT), enhanced cell identity (E-CID), real-time kinematic (RTK), state space representation (SSR), wireless local area network (WLAN), Bluetooth, sensors, or any combination thereof.

Clause 32. The UE of any of clauses 29 to 31, wherein the first positioning assistance comprises a first on-demand positioning reference signal (PRS) configuration, wherein the second positioning assistance comprises a second on-demand PRS configuration.

Clause 33. The UE of clause 32, wherein the at least one processor is further configured to: transmit, via the at least one transceiver, one or more parameters for the first on-demand PRS configuration in the first request assistance data message; and transmit, via the at least one transceiver, one or more parameters for the second on-demand PRS configuration in the second request assistance data message.

Clause 34. The UE of any of clauses 32 to 33, wherein the at least one processor is further configured to: receive, via the at least one transceiver, a plurality of on-demand PRS configurations that can be activated to support positioning of the UE, wherein the first on-demand PRS configuration and the second on-demand PRS configuration are each members of the plurality of on-demand PRS configurations.

Clause 35. The UE of clause 34, wherein the at least one processor is further configured to: receive, via the at least one transceiver, the plurality of on-demand PRS configurations from the location server in one or more provide assistance data messages; or receive, via the at least one transceiver, the plurality of on-demand PRS configurations by broadcast from a base station in one or more positioning system information blocks (posSIBs).

Clause 36. The UE of any of clauses 32 to 35, wherein: the second on-demand PRS configuration is the same as the first on-demand PRS configuration, or the second on-demand PRS configuration is different from the first on-demand PRS configuration.

Clause 37. The UE of any of clauses 32 to 36, wherein the at least one processor is further configured to: receive, via the at least one transceiver, a second provide assistance data message from the location server, the second provide assistance data message indicating at least that the location server activated the second on-demand PRS configuration.

Clause 38. The UE of any of clauses 32 to 37, wherein: the first on-demand PRS configuration is for a first type of positioning method between the UE and the location server, the first request assistance data message further includes a third identifier of a third on-demand PRS configuration, and the third on-demand PRS configuration is for a second type of positioning method between the UE and the location server.

Clause 39. The UE of any of clauses 32 to 38, wherein: the first request assistance data message further includes a start time and a duration for the first on-demand PRS configuration, the provide assistance data message further includes a fulfillment time that is greater than the start time and less than the duration and indicates when the location server expects to be able to activate the first on-demand PRS configuration, and the at least one processor is further configured to: determine that the first on-demand PRS configuration has been activated prior to or at the fulfillment time; and refrain from transmitting the second request assistance data message to the location server after expiration of the reattempt time from reception of the provide assistance data message based on determining that the first on-demand PRS configuration has been activated.

Clause 40. The UE of clause 39, wherein the at least one processor is further configured to: determine that the first on-demand PRS configuration has been activated based on monitoring system information from a base station.

Clause 41. The UE of any of clauses 29 to 40, wherein the at least one processor is further configured to: receive, via the at least one transceiver, the reattempt time in the provide assistance data message; receive, via the at least one transceiver, the reattempt time from a base station in system information; or receive, via the at least one transceiver, the reattempt time in a prior provide assistance data message received before transmission of the first request assistance data message.

Clause 42. The UE of any of clauses 29 to 41, wherein the reattempt time is: an absolute time, a number of seconds, a number of minutes, or a number of hours.

Clause 43. The UE of any of clauses 29 to 42, wherein the at least one processor is further configured to: receive, via the at least one transceiver, a second time from the location server in the provide assistance data message, the second time indicating a time by which the location server expects to provide the second positioning assistance to the UE.

Clause 44. The UE of clause 43, wherein the at least one processor is further configured to: receive, via the at least one transceiver, the second positioning assistance via broadcast from one or more gNBs prior to the second time; or receive, via the at least one transceiver, the second positioning assistance in a second provide assistance message prior to the second time.

Clause 45 The UE of any of clauses 43 to 44, wherein the second time occurs before the reattempt time, the at least one processor is further configured to: verify the first positioning assistance is not received prior to the second time; and transmit, via the at least one transceiver, the second request assistance data message to the location server after expiration of the reattempt time from reception of the provide assistance data message based on not receiving the first positioning assistance prior to the second time.

Clause 46. The UE of any of clauses 29 to 45, wherein the second request assistance data message indicates that the second request assistance data message is a repetition of the first request assistance data message.

Clause 47. A location server, comprising: a memory; at least one transceiver; and at least one processor communicatively coupled to the memory and the at least one transceiver, the at least one processor configured to: receive, via the at least one transceiver, a first request assistance data message from a user equipment (UE), the first request assistance data message comprising a request for first positioning assistance; transmit, via the at least one transceiver, a provide assistance data message to the UE, the provide assistance data message indicating that the location server is not currently able to provide the first positioning assistance; and receive, via the at least one transceiver, a second request assistance data message from the UE after expiration of a reattempt time from reception of the provide assistance data message, the second request assistance data message indicating a request for second positioning assistance, wherein the first positioning assistance is not transmitted to the UE prior to the reattempt time.

Clause 48. The location server of clause 47, wherein: each of the first positioning assistance and the second positioning assistance comprise assistance data for one or more positioning methods, and the one or more positioning methods include: assisted global navigation satellite system (A-GNSS), observed time-difference of arrival (OTDOA), downlink time-difference of arrival (DL-TDOA), downlink angle-of-departure (DL-AoD), multi-cell round-trip-time (RTT), enhanced cell identity (E-CID), real-time kinematic (RTK), state space representation (SSR), wireless local area network (VLAN), Bluetooth, sensors, or any combination thereof.

Clause 49. The location server of any of clauses 47 to 48, wherein the first positioning assistance comprises a first on-demand positioning reference signal (PRS) configuration, wherein the second positioning assistance comprises a second on-demand PRS configuration.

Clause 50. The location server of clause 49, wherein the at least one processor is further configured to: receive, via the at least one transceiver, one or more parameters for the first on-demand PRS configuration in the first request assistance data message; and receive, via the at least one transceiver, one or more parameters for the second on-demand PRS configuration in the second request assistance data message.

Clause 51. The location server of any of clauses 49 to 50, wherein the at least one processor is further configured to: transmit, via the at least one transceiver, to the UE, a plurality of on-demand PRS configurations that can be activated to support positioning of the UE, wherein the first on-demand PRS configuration and the second on-demand PRS configuration are each members of the plurality of on-demand PRS configurations.

Clause 52. The location server of any of clauses 49 to 51, wherein the at least one processor is further configured to: transmit, via the at least one transceiver, a second provide assistance data message to the UE, the second provide assistance data message indicating at least that the location server activated the second on-demand PRS configuration.

Clause 53. The location server of any of clauses 49 to 52, wherein: the first request assistance data message further includes a start time and a duration for the first on-demand PRS configuration, the provide assistance data message further includes a fulfillment time that is greater than the start time and less than the duration and indicates when the location server expects to be able to activate the first on-demand PRS configuration.

Clause 54. The location server of any of clauses 47 to 53, wherein the at least one processor is further configured to: transmit, via the at least one transceiver, the reattempt time in the provide assistance data message; or transmit, via the at least one transceiver, the reattempt time in a prior provide assistance data message transmitted before transmission of the first request assistance data message.

Clause 55. The location server of any of clauses 47 to 54, wherein the at least one processor is further configured to: transmit, via the at least one transceiver, a second time to the UE in the provide assistance data message, the second time indicating a time by which the location server expects to provide the second positioning assistance to the UE.

Clause 56. The location server of clause 55, wherein the at least one processor is further configured to: transmit, via the at least one transceiver, the second positioning assistance in a second provide assistance message prior to the second time.

Clause 57. A user equipment (UE), comprising: means for transmitting a first request assistance data message to a location server, the first request assistance data message comprising a request for first positioning assistance; means for receiving a provide assistance data message from the location server, the provide assistance data message indicating that the location server is not currently able to provide the first positioning assistance; and means for transmitting a second request assistance data message to the location server after expiration of a reattempt time from reception of the provide assistance data message, the second request assistance data message indicating a request for second positioning assistance, wherein the first positioning assistance is not received by the UE prior to the reattempt time.

Clause 58. The UE of clause 57, wherein each of the first positioning assistance and the second positioning assistance comprise assistance data for one or more positioning methods.

Clause 59. The UE of clause 58, wherein the one or more positioning methods include: assisted global navigation satellite system (A-GNSS), observed time-difference of arrival (OTDOA), downlink time-difference of arrival (DL-TDOA), downlink angle-of-departure (DL-AoD), multi-cell round-trip-time (RTT), enhanced cell identity (E-CID), real-time kinematic (RTK), state space representation (SSR), wireless local area network (WLAN), Bluetooth, sensors, or any combination thereof.

Clause 60. The UE of any of clauses 57 to 59, wherein the first positioning assistance comprises a first on-demand positioning reference signal (PRS) configuration, wherein the second positioning assistance comprises a second on-demand PRS configuration.

Clause 61. The UE of clause 60, further comprising: means for transmitting one or more parameters for the first on-demand PRS configuration in the first request assistance data message; and means for transmitting one or more parameters for the second on-demand PRS configuration in the second request assistance data message.

Clause 62. The UE of any of clauses 60 to 61, further comprising: means for receiving a plurality of on-demand PRS configurations that can be activated to support positioning of the UE, wherein the first on-demand PRS configuration and the second on-demand PRS configuration are each members of the plurality of on-demand PRS configurations.

Clause 63. The UE of clause 62, further comprising: means for receiving the plurality of on-demand PRS configurations from the location server in one or more provide assistance data messages; or means for receiving the plurality of on-demand PRS configurations by broadcast from a base station in one or more positioning system information blocks (posSIBs).

Clause 64. The UE of any of clauses 60 to 63, wherein: the second on-demand PRS configuration is the same as the first on-demand PRS configuration, or the second on-demand PRS configuration is different from the first on-demand PRS configuration.

Clause 65. The UE of any of clauses 60 to 64, further comprising: means for receiving a second provide assistance data message from the location server, the second provide assistance data message indicating at least that the location server activated the second on-demand PRS configuration.

Clause 66. The UE of any of clauses 60 to 65, wherein: the first on-demand PRS configuration is for a first type of positioning method between the UE and the location server, the first request assistance data message further includes a third identifier of a third on-demand PRS configuration, and the third on-demand PRS configuration is for a second type of positioning method between the UE and the location server.

Clause 67. The UE of any of clauses 60 to 66, wherein: the first request assistance data message further includes a start time and a duration for the first on-demand PRS configuration, the provide assistance data message further includes a fulfillment time that is greater than the start time and less than the duration and indicates when the location server expects to be able to activate the first on-demand PRS configuration, and the UE further comprises: means for determining that the first on-demand PRS configuration has been activated prior to or at the fulfillment time; and means for refraining from transmitting the second request assistance data message to the location server after expiration of the reattempt time from reception of the provide assistance data message based on determining that the first on-demand PRS configuration has been activated.

Clause 68. The UE of clause 67, further comprising: means for determining that the first on-demand PRS configuration has been activated based on monitoring system information from a base station.

Clause 69. The UE of any of clauses 57 to 68, further comprising: means for receiving the reattempt time in the provide assistance data message; means for receiving the reattempt time from a base station in system information; or means for receiving the reattempt time in a prior provide assistance data message received before transmission of the first request assistance data message.

Clause 70. The UE of any of clauses 57 to 69, wherein the reattempt time is: an absolute time, a number of seconds, a number of minutes, or a number of hours.

Clause 71. The UE of any of clauses 57 to 70, further comprising: means for receiving a second time from the location server in the provide assistance data message, the second time indicating a time by which the location server expects to provide the second positioning assistance to the UE.

Clause 72. The UE of clause 71, further comprising: means for receiving the second positioning assistance via broadcast from one or more gNBs prior to the second time; or means for receiving the second positioning assistance in a second provide assistance message prior to the second time.

Clause 73. The UE of any of clauses 71 to 72, wherein the second time occurs before the reattempt time, the UE further comprising: means for verifying the first positioning assistance is not received prior to the second time; and means for transmitting the second request assistance data message to the location server after expiration of the reattempt time from reception of the provide assistance data message based on not receiving the first positioning assistance prior to the second time.

Clause 74. The UE of any of clauses 57 to 73, wherein the second request assistance data message indicates that the second request assistance data message is a repetition of the first request assistance data message.

Clause 75. A location server, comprising: means for receiving a first request assistance data message from a user equipment (UE), the first request assistance data message comprising a request for first positioning assistance; means for transmitting a provide assistance data message to the UE, the provide assistance data message indicating that the location server is not currently able to provide the first positioning assistance; and means for receiving a second request assistance data message from the UE after expiration of a reattempt time from reception of the provide assistance data message, the second request assistance data message indicating a request for second positioning assistance, wherein the first positioning assistance is not transmitted to the UE prior to the reattempt time.

Clause 76. The location server of clause 75, wherein: each of the first positioning assistance and the second positioning assistance comprise assistance data for one or more positioning methods, and the one or more positioning methods include: assisted global navigation satellite system (A-GNSS), observed time-difference of arrival (OTDOA), downlink time-difference of arrival (DL-TDOA), downlink angle-of-departure (DL-AoD), multi-cell round-trip-time (RTI), enhanced cell identity (E-CID), real-time kinematic (RTK), state space representation (SSR), wireless local area network (WLAN), Bluetooth, sensors, or any combination thereof.

Clause 77. The location server of any of clauses 75 to 76, wherein the first positioning assistance comprises a first on-demand positioning reference signal (PRS) configuration, wherein the second positioning assistance comprises a second on-demand PRS configuration.

Clause 78. The location server of clause 77, further comprising: means for receiving one or more parameters for the first on-demand PRS configuration in the first request assistance data message; and means for receiving one or more parameters for the second on-demand PRS configuration in the second request assistance data message.

Clause 79. The location server of any of clauses 77 to 78, further comprising: means for transmitting, to the UE, a plurality of on-demand PRS configurations that can be activated to support positioning of the UE, wherein the first on-demand PRS configuration and the second on-demand PRS configuration are each members of the plurality of on-demand PRS configurations.

Clause 80. The location server of any of clauses 77 to 79, further comprising: means for transmitting a second provide assistance data message to the UE, the second provide assistance data message indicating at least that the location server activated the second on-demand PRS configuration.

Clause 81. The location server of any of clauses 77 to 80, wherein: the first request assistance data message further includes a start time and a duration for the first on-demand PRS configuration, and the provide assistance data message further includes a fulfillment time that is greater than the start time and less than the duration and indicates when the location server expects to be able to activate the first on-demand PRS configuration.

Clause 82. The location server of any of clauses 75 to 81, further comprising: means for transmitting the reattempt time in the provide assistance data message; or means for transmitting the reattempt time in a prior provide assistance data message transmitted before transmission of the first request assistance data message.

Clause 83. The location server of any of clauses 75 to 82, further comprising: means for transmitting a second time to the UE in the provide assistance data message, the second time indicating a time by which the location server expects to provide the second positioning assistance to the UE.

Clause 84. The location server of clause 83, further comprising: means for transmitting the second positioning assistance in a second provide assistance message prior to the second time.

Clause 85. A non-transitory computer-readable medium storing computer-executable instructions that, when executed by a user equipment (UE), cause the UE to: transmit a first request assistance data message to a location server, the first request assistance data message comprising a request for first positioning assistance; receive a provide assistance data message from the location server, the provide assistance data message indicating that the location server is not currently able to provide the first positioning assistance; and transmit a second request assistance data message to the location server after expiration of a reattempt time from reception of the provide assistance data message, the second request assistance data message indicating a request for second positioning assistance, wherein the first positioning assistance is not received by the UE prior to the reattempt time.

Clause 86. The non-transitory computer-readable medium of clause 85, wherein each of the first positioning assistance and the second positioning assistance comprise assistance data for one or more positioning methods.

Clause 87. The non-transitory computer-readable medium of clause 86, wherein the one or more positioning methods include: assisted global navigation satellite system (A-GNSS), observed time-difference of arrival (OTDOA), downlink time-difference of arrival (DL-TDOA), downlink angle-of-departure (DL-AoD), multi-cell round-trip-time (RTT), enhanced cell identity. (E-CID), real-time kinematic (RTK), state space representation (SSR), wireless local area network (WLAN), Bluetooth, sensors, or any combination thereof.

Clause 88. The non-transitory computer-readable medium of any of clauses 85 to 87, wherein the first positioning assistance comprises a first on-demand positioning reference signal (PRS) configuration, wherein the second positioning assistance comprises a second on-demand PRS configuration.

Clause 89. The non-transitory computer-readable medium of clause 88, further comprising computer-executable instructions that, when executed by the UE, cause the UE to: transmit one or more parameters for the first on-demand PRS configuration in the first request assistance data message; and transmit one or more parameters for the second on-demand PRS configuration in the second request assistance data message.

Clause 90. The non-transitory computer-readable medium of any of clauses 88 to 89, further comprising computer-executable instructions that, when executed by the UE, cause the UE to: receive a plurality of on-demand PRS configurations that can be activated to support positioning of the UE, wherein the first on-demand PRS configuration and the second on-demand PRS configuration are each members of the plurality of on-demand PRS configurations.

Clause 91. The non-transitory computer-readable medium of clause 90, further comprising computer-executable instructions that, when executed by the UE, cause the UE to: receive the plurality of on-demand PRS configurations from the location server in one or more provide assistance data messages; or receive the plurality of on-demand PRS configurations by broadcast from a base station in one or more positioning system information blocks (posSIBs).

Clause 92. The non-transitory computer-readable medium of any of clauses 88 to 91, wherein: the second on-demand PRS configuration is the same as the first on-demand PRS configuration, or the second on-demand PRS configuration is different from the first on-demand PRS configuration.

Clause 93. The non-transitory computer-readable medium of any of clauses 88 to 92, further comprising computer-executable instructions that, when executed by the UE, cause the UE to: receive a second provide assistance data message from the location server, the second provide assistance data message indicating at least that the location server activated the second on-demand PRS configuration.

Clause 94. The non-transitory computer-readable medium of any of clauses 88 to 93, wherein: the first on-demand PRS configuration is for a first type of positioning method between the UE and the location server, the first request assistance data message further includes a third identifier of a third on-demand PRS configuration, and the third on-demand PRS configuration is for a second type of positioning method between the UE and the location server.

Clause 95. The non-transitory computer-readable medium of any of clauses 88 to 94, wherein: the first request assistance data message further includes a start time and a duration for the first on-demand PRS configuration, the provide assistance data message further includes a fulfillment time that is greater than the start time and less than the duration and indicates when the location server expects to be able to activate the first on-demand PRS configuration, and the non-transitory computer-readable medium further comprises computer-executable instructions that, when executed by the UE, cause the UE to: determine that the first on-demand PRS configuration has been activated prior to or at the fulfillment time; and refrain from transmitting the second request assistance data message to the location server after expiration of the reattempt time from reception of the provide assistance data message based on determining that the first on-demand PRS configuration has been activated.

Clause 96. The non-transitory computer-readable medium of clause 95, further comprising computer-executable instructions that, when executed by the UE, cause the UE to: determine that the first on-demand PRS configuration has been activated based on monitoring system information from a base station.

Clause 97. The non-transitory computer-readable medium of any of clauses 85 to 96, further comprising computer-executable instructions that, when executed by the UE, cause the UE to: receive the reattempt time in the provide assistance data message; receive the reattempt time from a base station in system information; or receive the reattempt time in a prior provide assistance data message received before transmission of the first request assistance data message.

Clause 98. The non-transitory computer-readable medium of any of clauses 85 to 97, wherein the reattempt time is: an absolute time, a number of seconds, a number of minutes, or a number of hours.

Clause 99. The non-transitory computer-readable medium of any of clauses 85 to 98, further comprising computer-executable instructions that, when executed by the UE, cause the UE to: receive a second time from the location server in the provide assistance data message, the second time indicating a time by which the location server expects to provide the second positioning assistance to the UE.

Clause 100. The non-transitory computer-readable medium of clause 99, further comprising computer-executable instructions that, when executed by the UE, cause the UE to: receive the second positioning assistance via broadcast from one or more gNBs prior to the second time; or receive the second positioning assistance in a second provide assistance message prior to the second time.

Clause 101. The non-transitory computer-readable medium of any of clauses 99 to 100, wherein the second time occurs before the reattempt time, the non-transitory computer-readable medium further comprising computer-executable instructions that, when executed by the UE, cause the UE to: verify the first positioning assistance is not received prior to the second time; and transmit the second request assistance data message to the location server after expiration of the reattempt time from reception of the provide assistance data message based on not receiving the first positioning assistance prior to the second time.

Clause 102. The non-transitory computer-readable medium of any of clauses 85 to 101, wherein the second request assistance data message indicates that the second request assistance data message is a repetition of the first request assistance data message.

Clause 103. A non-transitory computer-readable medium storing computer-executable instructions that, when executed by a location server, cause the location server to: receive a first request assistance data message from a user equipment (UE), the first request assistance data message comprising a request for first positioning assistance; transmit a provide assistance data message to the UE, the provide assistance data message indicating that the location server is not currently able to provide the first positioning assistance; and receive a second request assistance data message from the UE after expiration of a reattempt time from reception of the provide assistance data message, the second request assistance data message indicating a request for second positioning assistance, wherein the first positioning assistance is not transmitted to the UE prior to the reattempt time.

Clause 104. The non-transitory computer-readable medium of clause 103, wherein: each of the first positioning assistance and the second positioning assistance comprise assistance data for one or more positioning methods, and the one or more positioning methods include: assisted global navigation satellite system (A-GNSS), observed time-difference of arrival (OTDOA), downlink time-difference of arrival (DL-TDOA), downlink angle-of-departure (DL-AoD), multi-cell round-trip-time (RTT), enhanced cell identity (E-CID), real-time kinematic (RTK), state space representation (SSR), wireless local area network (WLAN), Bluetooth, sensors, or any combination thereof.

Clause 105. The non-transitory computer-readable medium of any of clauses 103 to 104, wherein the first positioning assistance comprises a first on-demand positioning reference signal (PRS) configuration, wherein the second positioning assistance comprises a second on-demand PRS configuration.

Clause 106. The non-transitory computer-readable medium of clause 105, further comprising computer-executable instructions that, when executed by the location server, cause the location server to: receive one or more parameters for the first on-demand PRS configuration in the first request assistance data message; and receive one or more parameters for the second on-demand PRS configuration in the second request assistance data message.

Clause 107. The non-transitory computer-readable medium of any of clauses 105 to 106, further comprising computer-executable instructions that, when executed by the location server, cause the location server to: transmit, to the UE, a plurality of on-demand PRS configurations that can be activated to support positioning of the UE, wherein the first on-demand PRS configuration and the second on-demand PRS configuration are each members of the plurality of on-demand PRS configurations.

Clause 108. The non-transitory computer-readable medium of any of clauses 105 to 107, further comprising computer-executable instructions that, when executed by the location server, cause the location server to: transmit a second provide assistance data message to the UE, the second provide assistance data message indicating at least that the location server activated the second on-demand PRS configuration.

Clause 109. The non-transitory computer-readable medium of any of clauses 105 to 108, wherein: the first request assistance data message further includes a start time and a duration for the first on-demand PRS configuration, and the provide assistance data message further includes a fulfillment time that is greater than the start time and less than the duration and indicates when the location server expects to be able to activate the first on-demand PRS configuration.

Clause 110. The non-transitory computer-readable medium of any of clauses 103 to 109, further comprising computer-executable instructions that, when executed by the location server, cause the location server to: transmit the reattempt time in the provide assistance data message; or transmit the reattempt time in a prior provide assistance data message transmitted before transmission of the first request assistance data message.

Clause 111. The non-transitory computer-readable medium of any of clauses 103 to 110, further comprising computer-executable instructions that, when executed by the location server, cause the location server to: transmit a second time to the UE in the provide assistance data message, the second time indicating a time by which the location server expects to provide the second positioning assistance to the UE.

Clause 112. The non-transitory computer-readable medium of clause 111, further comprising computer-executable instructions that, when executed by the location server, cause the location server to: transmit the second positioning assistance in a second provide assistance message prior to the second time.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA.), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a user equipment (UE), comprising:
- transmitting a first request assistance data message to a location server, the first request assistance data message comprising a request for first positioning assistance;
- receiving a provide assistance data message from the location server, wherein the provide assistance data message indicates that the location server is not currently able to provide the first positioning assistance, and wherein the provide assistance data message includes a second time indicating a time by which the location server expects to provide second positioning assistance to the UE; and
- transmitting a second request assistance data message to the location server after expiration of a reattempt time from reception of the provide assistance data message, the second request assistance data message indicating a request for the second positioning assistance, wherein the first positioning assistance is not received by the UE prior to the reattempt time.

2. A user equipment (UE), comprising:
- a memory;
- one or more transceivers; and
- one or more processors communicatively coupled to the memory and the one or more transceivers, the one or more processors, either alone or in combination, configured to:
  - transmit, via the one or more transceivers, a first request assistance data message to a location server, the first request assistance data message comprising a request for first positioning assistance;
  - receive, via the one or more transceivers, a provide assistance data message from the location server, wherein the provide assistance data message indicates that the location server is not currently able to provide the first positioning assistance, and wherein the provide assistance data message includes a second time indicating a time by which the location server expects to provide second positioning assistance to the UE; and
  - transmit, via the one or more transceivers, a second request assistance data message to the location server after expiration of a reattempt time from reception of the provide assistance data message, the second request assistance data message indicating a request for the second positioning assistance, wherein the first positioning assistance is not received by the UE prior to the reattempt time.

3. The UE of claim 2, wherein each of the first positioning assistance and the second positioning assistance comprise assistance data for one or more positioning methods.

4. The UE of claim 3, wherein the one or more positioning methods include: assisted global navigation satellite system (A-GNSS), observed time-difference of arrival (OTDOA), downlink time-difference of arrival (DL-TDOA), downlink angle-of-departure (DL-AoD), multi-cell round-trip-time (RTT), enhanced cell identity (E-CID), real-time kinematic (RTK), state space representation (SSR), wireless local area network (WLAN), Bluetooth, sensors, or any combination thereof.

5. The UE of claim 2, wherein the first positioning assistance comprises a first on-demand positioning reference signal (PRS) configuration, wherein the second positioning assistance comprises a second on-demand PRS configuration.

6. The UE of claim 5, wherein the one or more processors, either alone or in combination, are further configured to:
- transmit, via the one or more transceivers, one or more parameters for the first on-demand PRS configuration in the first request assistance data message; and
- transmit, via the one or more transceivers, one or more parameters for the second on-demand PRS configuration in the second request assistance data message.

7. The UE of claim 5, wherein the one or more processors, either alone or in combination, are further configured to:
- receive, via the one or more transceivers, a plurality of on-demand PRS configurations that can be activated to support positioning of the UE, wherein the first on-demand PRS configuration and the second on-demand PRS configuration are each members of the plurality of on-demand PRS configurations.

8. The UE of claim 7, wherein the one or more processors, either alone or in combination, are further configured to:
- receive, via the one or more transceivers, the plurality of on-demand PRS configurations from the location server in one or more provide assistance data messages; or
- receive, via the one or more transceivers, the plurality of on-demand PRS configurations by broadcast from a base station in one or more positioning system information blocks (posSIBs).

9. The UE of claim 5, wherein:
- the second on-demand PRS configuration is the same as the first on-demand PRS configuration, or
- the second on-demand PRS configuration is different from the first on-demand PRS configuration.

10. The UE of claim 5, wherein the one or more processors, either alone or in combination, are further configured to:
- receive, via the one or more transceivers, a second provide assistance data message from the location server, the second provide assistance data message indicating at least that the location server activated the second on-demand PRS configuration.

11. The UE of claim 5, wherein:

the first on-demand PRS configuration is for a first type of positioning method between the UE and the location server, the first request assistance data message further includes a third identifier of a third on-demand PRS configuration, and the third on-demand PRS configuration is for a second type of positioning method between the UE and the location server.

12. The UE of claim 5, wherein:

the first request assistance data message further includes a start time and a duration for the first on-demand PRS configuration, the provide assistance data message further includes a fulfillment time that is greater than the start time and less than the duration and indicates when the location server expects to be able to activate the first on-demand PRS configuration, and the one or more processors, either alone or in combination, are further configured to:

determine that the first on-demand PRS configuration has been activated prior to or at the fulfillment time; and refrain from transmitting the second request assistance data message to the location server after expiration of the reattempt time from reception of the provide assistance data message based on determining that the first on-demand PRS configuration has been activated.

13. The UE of claim 12, wherein the one or more processors, either alone or in combination, are further configured to:

determine that the first on-demand PRS configuration has been activated based on monitoring system information from a base station.

14. The UE of claim 2, wherein the one or more processors, either alone or in combination, are further configured to:

receive, via the one or more transceivers, the reattempt time in the provide assistance data message;

receive, via the one or more transceivers, the reattempt time from a base station in system information; or receive, via the one or more transceivers, the reattempt time in a prior provide assistance data message received before transmission of the first request assistance data message.

15. The UE of claim 2, wherein the reattempt time is:

an absolute time, a number of seconds, a number of minutes, or a number of hours.

16. The UE of claim 2, wherein the one or more processors, either alone or in combination, are further configured to:

receive, via the one or more transceivers, the second positioning assistance via broadcast from one or more gNBs prior to the second time; or receive, via the one or more transceivers, the second positioning assistance in a second provide assistance message prior to the second time.

17. The UE of claim 2, wherein the second time occurs before the reattempt time, and wherein the one or more processors, either alone or in combination, are further configured to:

verify the first positioning assistance is not received prior to the second time; and transmit, via the one or more transceivers, the second request assistance data message to the location server after expiration of the reattempt time from reception of the provide assistance data message based on not receiving the first positioning assistance prior to the second time.

18. The UE of claim 2, wherein the second request assistance data message indicates that the second request assistance data message is a repetition of the first request assistance data message.

19. A user equipment (UE), comprising:

means for transmitting a first request assistance data message to a location server, the first request assistance data message comprising a request for first positioning assistance;

means for receiving a provide assistance data message from the location server, wherein the provide assistance data message indicates indicating that the location server is not currently able to provide the first positioning assistance, and wherein the provide assistance data message includes a second time indicating a time by which the location server expects to provide second positioning assistance to the UE; and means for transmitting a second request assistance data message to the location server after expiration of a reattempt time from reception of the provide assistance data message, the second request assistance data message indicating a request for the second positioning assistance, wherein the first positioning assistance is not received by the UE prior to the reattempt time.

* * * * *